(12) United States Patent
Saito

(10) Patent No.: US 8,316,049 B2
(45) Date of Patent: Nov. 20, 2012

(54) DOCUMENT MANAGEMENT SYSTEM, DOCUMENT PRODUCING APPARATUS, DOCUMENT USE MANAGING APPARATUS, AND COMPUTER READABLE MEDIUM

(75) Inventor: Kazuo Saito, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 771 days.

(21) Appl. No.: 12/372,263

(22) Filed: Feb. 17, 2009

(65) Prior Publication Data

US 2010/0082687 A1 Apr. 1, 2010

(30) Foreign Application Priority Data

Sep. 19, 2008 (JP) ................... 2008-240661

(51) Int. Cl.
*G06F 17/30* (2006.01)
(52) U.S. Cl. .................. 707/781; 707/783; 707/785
(58) Field of Classification Search .................. None
See application file for complete search history.

(56) References Cited

U.S. PATENT DOCUMENTS

| | | | |
|---|---|---|---|
| 6,990,490 B2 * | 1/2006 | Sasaki et al. | 1/1 |
| 2003/0105950 A1 | 6/2003 | Hirano et al. | |
| 2004/0243582 A1 * | 12/2004 | Sasaki et al. | 707/9 |
| 2006/0168325 A1 * | 7/2006 | Wood et al. | 709/238 |
| 2007/0050368 A1 | 3/2007 | Watanabe | |
| 2007/0208665 A1 | 9/2007 | Ohara | |
| 2007/0288991 A1 | 12/2007 | Takaragi et al. | |
| 2007/0299969 A1 | 12/2007 | Kunitake et al. | |
| 2009/0100525 A1 | 4/2009 | Uchikawa | |

FOREIGN PATENT DOCUMENTS

| | | |
|---|---|---|
| JP | 2005-38371 A | 2/2005 |
| JP | 2007-58567 A | 3/2007 |
| JP | 2007-233818 A | 9/2007 |
| JP | 2007-310821 A | 11/2007 |
| JP | 2007-316952 A | 12/2007 |
| JP | 2008-3846 A | 1/2008 |
| JP | 2008-052645 A | 3/2008 |
| JP | 2008-219875 A | 9/2008 |

OTHER PUBLICATIONS

Notification of Reasons for Refusal dated Jun. 22, 2010, issued in counterpart Japanese Application No. 2008-240661.

* cited by examiner

*Primary Examiner* — Baoquoc N To
(74) *Attorney, Agent, or Firm* — Sughrue Mion, PLLC

(57) ABSTRACT

A document management system includes: a document producing apparatus including a protected document producing unit; and a document use managing apparatus including: a document information storage; a document information registering unit; a use restriction information storage; and a use restriction information registering unit.

4 Claims, 18 Drawing Sheets

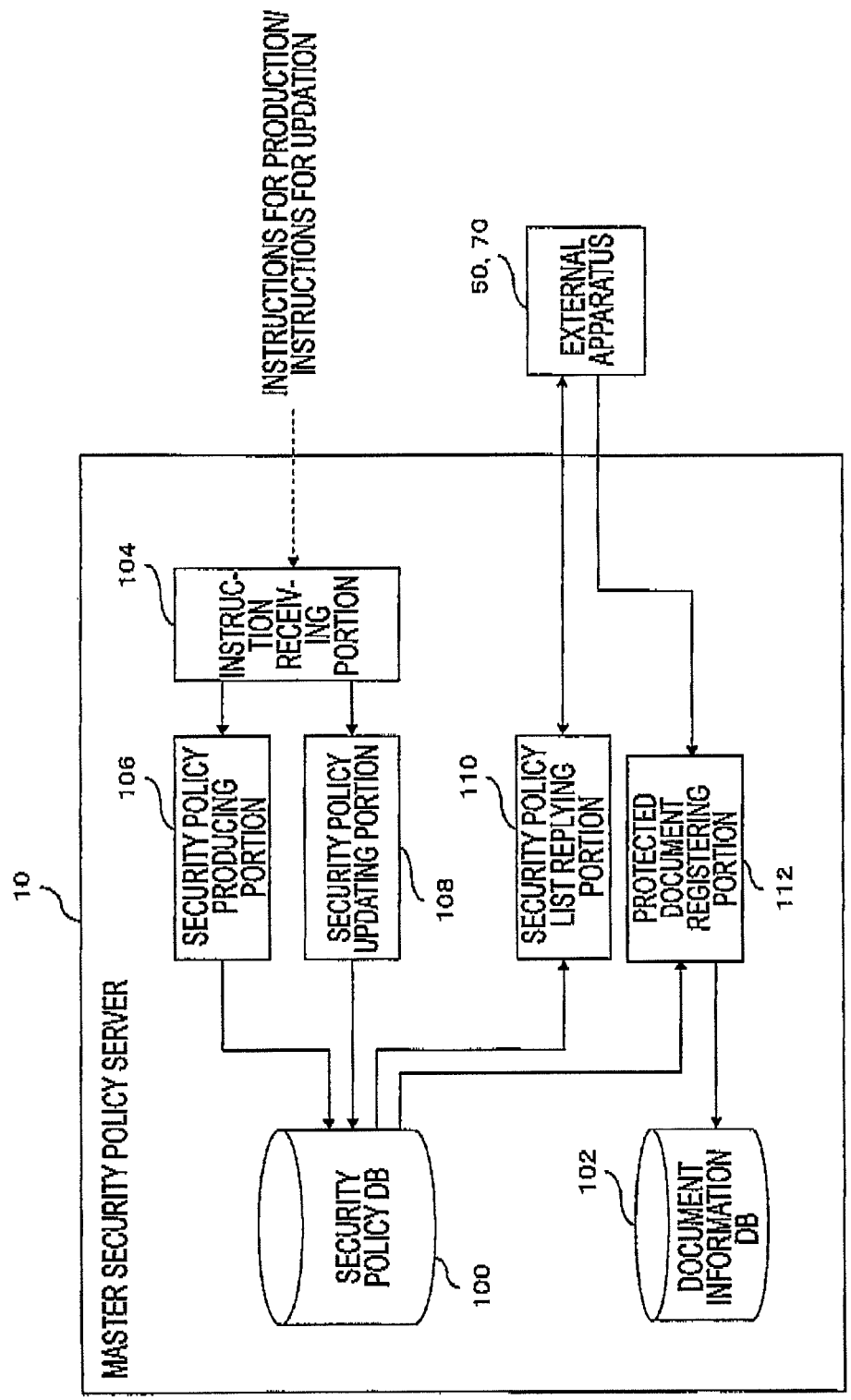

FIG. 3

| POLICY ID | NAME OF POLICY | USABLE RANGE | VALIDITY PERIOD | ALLOWED FUNCTION LIST | INVALIDATION FLAG | DATE AND TIME OF UPDATION |
|---|---|---|---|---|---|---|
| 0001 | INTERNAL INFORMATION OF SOFTWARE DEVELOPMENT | NAME OF ORGANIZATION: SOFTWARE DEVELOPMENT DEPARTMENT | 180 DAYS AFTER PRODUCTION | BROWSING OF ELECTRONIC DOCUMENT PRINTING OF ELECTRONIC DOCUMENT COPYING OF PAPER DOCUMENT | | |
| | | DEVELOPMENT CONTRACTOR; USER A, USER B | 180 DAYS AFTER PRODUCTION | BROWSING OF ELECTRONIC DOCUMENT PRINTING OF ELECTRONIC DOCUMENT | | |
| | | PRODUCER | INDEFINITE PERIOD | BROWSING OF ELECTRONIC DOCUMENT EDITING OF ELECTRONIC DOCUMENT PRINTING OF ELECTRONIC DOCUMENT COPYING OF PAPER DOCUMENT SCANNING OF PAPER DOCUMENT | FALSE | 20-9-2006 13:06 |
| 0002 | CUSTOMER INFORMATION | PRODUCE CONTRACTOR OF INPUTTING WORK: USER X, USER Y | 7 DAYS AFTER PRODUCTION | BROWSING OF ELECTRONIC DOCUMENT | | |
| | | PRODUCER | INDEFINITE PERIOD | BROWSING OF ELECTRONIC DOCUMENT EDITING OF ELECTRONIC DOCUMENT PRINTING OF ELECTRONIC DOCUMENT COPYING OF PAPER DOCUMENT SCANNING OF PAPER DOCUMENT | FALSE | 22-9-2006 10:24 |
| ... | ... | ... | ... | ... | ... | ... |

FIG. 4

| DOCUMENT ID | POLICY ID | PRODUCER ID | DATE AND TIME OF PRODUCTION | |
|---|---|---|---|---|
| 40ffaaa4-0fb6-4634-85bf-bba45bc941b5 | 0001 | fx12345 | 20-01-2007 | 10:00 |
| 4FB6BB00-3347-11d0-B40A-00AA005FF586 | 0002 | fx19810 | 01-10-2006 | 10:00 |
| AED6483F-3304-11d2-86F1-006008B0E5D2 | 0002 | fx25615 | 03-10-2006 | 14:23 |
| FDF9C30D-CCAB-3E2D-B584-9E24CE8038E3 | 0002 | fx16982 | 10-10-2006 | 16:32 |
| ... | ... | ... | ... | |

US 8,316,049 B2

DOCUMENT MANAGEMENT SYSTEM, DOCUMENT PRODUCING APPARATUS, DOCUMENT USE MANAGING APPARATUS, AND COMPUTER READABLE MEDIUM

CROSS-REFERENCE TO RELATED APPLICATIONS

This application is based on and claims priority under 35 U.S.C. 119 from Japanese Patent Application No. 2008-240661 filed Sep. 19, 2008.

BACKGROUND

1. Technical Field

The present invention relates to a document management system, a document producing apparatus, a document use managing apparatus, and a computer readable medium.

2. Related Art

As a technique for applying a use restriction on an electronic document configured by multimedia data including various kinds of data such as text data, image data, and audio data, for example, a technique which is called DRM (Digital Rights Management) is known. In a DRM, for an individual electronic document, a use privilege is set to each user. For example, a use privilege indicates a validity period when a use of the electronic document is allowed, kinds of operations which are allowed to be performed by each user, etc. A use privilege which has been once set for an electronic document may be sometimes changed. In a DRM, moreover, a use restriction is sometimes performed while a policy indicating contents of a use privilege (hereinafter, such a policy is sometimes referred to as security policy) is previously registered in a server, and the same policy is used with respect to a plurality of different electronic documents.

SUMMARY

According to an aspect of the present invention, a document management system includes: a document producing apparatus including a protected document producing unit that, in accordance with protected document production instructions including: information specifying a document which is an object of use restriction; and use restriction information containing a set of an operation subject and operations which the operation subject is allowed or inhibited to perform, produces a protected document which contains: a document specified by the protected document production instructions; and the use restriction information specified by the protected document production instructions; and a document use managing apparatus including: a document information storage that stores a document and the use restriction information which is used in use restriction of the document while the document and the use restriction information are associated with each other; a document information registering unit that, in response to a use request specifying the protected document which is an object of the request, refers the document information storage, and that, in a case where a document contained in the protected document specified by the use request is not stored in the document information storage, registers the document contained in the specified protected document, and the use restriction information contained in the specified protected document, while the document and the use restriction information are associated with each other; a use restriction information storage that store the use restriction information contained in the specified protected document; and a use restriction information registering unit that, in a case where the use restriction information contained in the specified protected document is not stored in use restriction information storage, registers the use restriction information contained in the specified protected document into the use restriction information storage, wherein determination whether the protected document which is the object of the request can be used or not is performed based on use restriction information associated with the document contained in the protected document that is specified by the use request in the use restriction information stored in the use restriction information storage, and a requester who issues the use request, and the document producing apparatus does not register information into the document information storage and the use restriction information storage.

BRIEF DESCRIPTION OF THE DRAWINGS

Exemplary embodiment of the present invention will be described in detail based on the following figures, wherein:

FIG. 2 is a block diagram schematically showing an example of the internal configuration of a master security policy server;

FIG. 3 is a view showing an example of data contents of a security policy DB;

FIG. 4 is a view showing an example of data contents of a document information DB;

DETAILED DESCRIPTION

Figure 1:
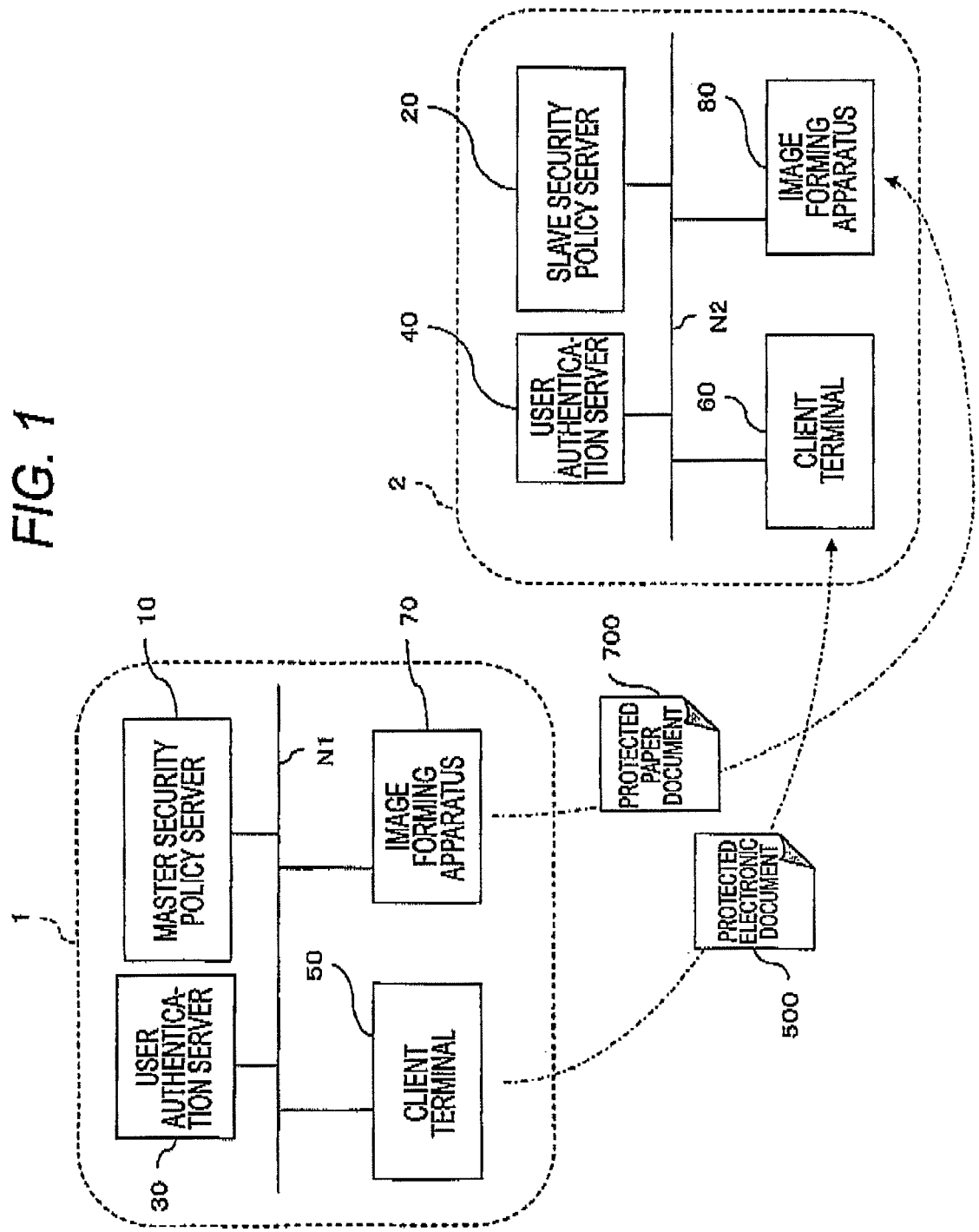
FIG. 1 is a diagram schematically showing an example of the configuration of the document management system.

FIG. 1 is a diagram schematically showing an example of the configuration of the document management system. The document management system of the example of FIG. 1 includes a master network 1 and a slave network 2. Each of the master network 1 and the slave network 2 is configured by apparatuses which are interconnected via a network N1 or N2 such as an intranet.

The apparatuses constituting the master network 1 include a master security policy server 10, a user authentication server 30, a client terminal 50, and an image forming apparatus 70. The apparatuses constituting the slave network 2 include a slave security policy server 20, a user authentication server 40, a client terminal 60, and an image forming apparatus 80.

The master security policy server 10 and the slave security policy server 20 manage security policies of documents (electronic documents and paper documents) which are handled by the system. The term "security policy" means use restriction information containing a combination of a subject who uses a document and kinds of operations which the subject is allowed or inhibited to perform. The master security policy server 10 has a function related to production of a document in which a security policy is set. The slave security policy server 20 has a function related to use of a document in which a security policy is set.

The client terminal 50 of the master network 1 communicates with the master security policy server 10, and produces an electronic document in which a security policy is set. The image forming apparatus 70 of the master network 1 communicates with the master security policy server 10, and produces a paper document in which a security policy is set.

In the following description, an electronic document in which a security policy is set is referred to as "protected electronic document", and a paper document in which a security policy is set is referred to as "protected paper document". A protected electronic document and a protected paper document are often generally referred to as "protected document".

The client terminal 60 and the image forming apparatus 80 of the slave network 2 communicate with the slave security policy server 20, and execute operations on a protected electronic document and a protected paper document.

For each of the master network 1 and the slave network 2, FIG. 1 shows one client terminal 50 or 60 and one image forming apparatus 70 or 80. Alternatively, each of the master network 1 and the slave network 2 may include plural client terminals 50 or 60 and plural image forming apparatuses 70 or 80.

In the document management system of the example of FIG. 1, the master network 1 and the slave network 2 are not connected to each other, so that the apparatuses of the master network 1 do not communicate with those of the slave network 2. Therefore, a protected electronic document which is produced by the client terminal 50 of the master network 1 is stored in, a movable storage medium such as a CD or a DVD, then moved to location of the client terminal 60 of the slave network 2, and read by the client terminal 60 to be used.

Actually, the master network 1 and the slave network 2 may be connected to each other via communicating means such as the Internet. Even in the case where the both networks are connected to each other, however, sets of information which are used respectively in the master network 1 and the slave network 2 are not transferred via the communicating means through which the networks are connected to each other.

Hereinafter, the apparatuses of the master network 1 will be described.

The user authentication server 30 manages authentication information of the user who is previously registered as a user of the document management system, and performs user authentication. When user authentication is successful as described later, the apparatuses of the master network 1 such as the client terminal 50 and the image forming apparatus 70 execute a process according to instructions of the user. Upon reception of an input of authentication information from the user such as identification information of the user and the password, the apparatuses of the master network 1 transmit the received information to the user authentication server to request the user authentication. In response to the request, the user authentication server performs the user authentication, and transmits a result of the authentication to the apparatus of the request source. The user authentication server is realized by a server such as an LDAP (Lightweight Directory Access Protocol) server or a Windows (registered trademark) Active Directory.

FIG. 2 is a diagram schematically showing an example of the internal configuration of the master security policy server 10. Referring to FIG. 2, the master security policy server 10 includes a security policy DB (database) 100, a document information DB 102, an instruction receiving portion 104, a security policy producing portion 106, a security policy updating portion 108, a security policy list replying portion 110, and a protected document registering portion 112.

The security policy DB 100 is a database which stores information related to the security policy. FIG. 3 shows an example of data contents of the security policy DB 100.

Referring to FIG. 3, while being associated with a policy ID which is identification information of each security policy, items or a policy name, a usable range, a validity period, an allowed function list, an invalidation flag, and the date and time of updation are registered in the security policy DB 100. The policy ID is identification information which is given to each security policy, and which is unique in the document management system. The policy name is a name which is given by the administrator or the like to a security policy. The usable range indicates the subject who operates a document, and is shown by identification information of a user or a user group which is managed by the user authentication server. The validity period indicates a period when a user indicated by the corresponding usable range can use a protected document in which the security policy is set. The allowed function list indicates kinds of operations which the user indicated by the corresponding usable range is allowed to perform. The kinds of operations include browsing, edition, printing, etc. For example, operations on a paper document are a copying operation, a scanning operation (an operation storing image data obtained as a result of reading by a scanner), etc. In the case where a protected document in which the security policy of policy ID "0001" of the table in the example of FIG. 3 is set is to be used by a user who belongs to "Software development department", and who did not produce the protected document, for example, an operation of "Browsing of electronic document", "Printing of electronic document", or "Copying of paper document" is allowed to be executed within 180 days from the production of the protected document. The invalidation flag indicates whether the security policy is valid or invalid. If the security policy is valid, a use restriction according to the security policy is performed on a protected document in which the security policy is set. If the security policy is invalid, any kind of use is inhibited with respect to a protected document in which the security policy is set. In the table in the example of FIG. 3, the value "FALSE" of the invalidation flag indicates that the corresponding security policy is valid, and, when the value of the invalidation flag is "TRUE", it is indicated that the corresponding security policy is invalid.

Returning to FIG. 2, the document information PB 102 is a database which stores information related to a protected document. FIG. 4 shows an example of data contents of the document information DB 102.

Referring to FIG. 4, while being associated with each document ID, a policy ID, a producer ID, and the date and time of production are registered in the document information DB 102. The document ID is identification information which is given to each protected document, and which is unique in the system. For example, a UUID (Universal Unique Identifier) is used as the document ID. The policy ID is a policy ID of a security policy which is set in the corresponding protected document. The policy ID is one of the policy IDs which are registered in the security policy DB 100. The producer ID is identification information of the user who produced the corresponding protected document. The date and time of production is the date and time when the corresponding protected document is produced.

In the description of the example of the embodiment, "Production" of a protected document means that, with respect to an electronic document or paper document in which a security policy is not set, a security policy is set to produce a protected electronic document or a protected paper document. The "Producer" of a protected document is a user who directs setting of a security policy in an unprotected document, and "Date and time of production" of a protected document is the date and time when a security policy is set in an unprotected document.

In the example of the embodiment, when a protected document is once produced, the document ID is not changed before and after execution of an operation on the protected document. Even when, by an operation on a protected document, the form of the protected document is changed from an electronic document to a paper document or from a paper document to an electronic document, the document ID is not changed. Namely, in a case such as that where a protected electronic document is edited to produce a protected electronic document containing new contents, that where a protected electronic document is printed to produce a protected paper document, that where a protected paper document is copied to produce a new protected paper document, or that where a protected paper document is scanned to produce a protected electronic document, for example, the protected document before execution of one of various kinds of operations, and that which is produced as result of the operation have the same identical document ID.

Referring again to FIG. 2, the instruction receiving portion 104 receives instructions of the administrator or the like with respect to (new) registration of a security policy for the security policy DB 100 or updation of a security policy which has been registered in the security policy DB 100. When receiving instructions for registration of a security policy, the instruction receiving portion 104 transfers the instructions to the security policy producing portion 106, and, when receiving instructions for updation of a security policy, transfers the instructions to the security policy updating portion 108.

The security policy producing portion 106 newly produces a security policy, and registers the newly produced security policy into the security policy DB 100. The security policy producing portion 106 gives a policy ID to the newly produced security policy, and newly produces a record containing the policy ID in the security policy DB 100. In accordance with the instructions which are obtained via the instruction receiving portion 104, the values of the items (see FIG. 3) of a record which is newly produced in the security policy DB 100 are registered. The security policy producing portion 106 of the example sets the date and time when the new record is produced, into the item of the update date and time of the record.

The security policy updating portion 108 updates a security policy which has been registered in the security policy DB 100. In accordance with the instructions which are obtained via the instruction receiving portion 104, for example, the security policy updating portion 108 changes the values of the items of a record of a policy ID which is designated as an updation object in the security policy DB 100. In the case where instruction for invalidating the security policy of a designated policy ID is received, the invalidation flag associated with the policy ID is rewritten from "FALSE" to "TRUE". When the value of the invalidation flag is once set to "TRUE", the value is not further rewritten to "FALSE". Alternatively, in accordance with instructions of the administrator or the like, for example, the value of the usable range, the validity period, or the allowed function list may be changed. When the values of the items of the records of the designated policy ID in the security policy DB 100 are changed in accordance with updation instructions, the security policy updating portion 108 rewrites the update date and time of the record to the current date and time.

In response to a request from an external apparatus such as the client terminal 50 or the image forming apparatus 70, the security policy list replying portion 110 performs a process of returning a list of security polices registered in the security policy DB 100. For example, the portion returns a list containing data contents of the security policy DB 100 shown in the table of the example of FIG. 3, to the external apparatus which is the request source.

In response to a request from an external apparatus, the protected document registering portion 112 performs a process of registering information related to a protected document produced by the external apparatus, into the document information DB 102. For example, the protected document registering portion 112 receives from the external apparatus a registration request containing the document ID of the protected document, the policy ID of the security policy which is set in the protected document, the producer ID of the producer of the protected document, and the date and time of production of the protected document, produces a new record in the document information DB 102, and sets the values of the items contained in the registration request, as the values of the items (see FIG. 4) of the record which is newly produced.

Figure 5:
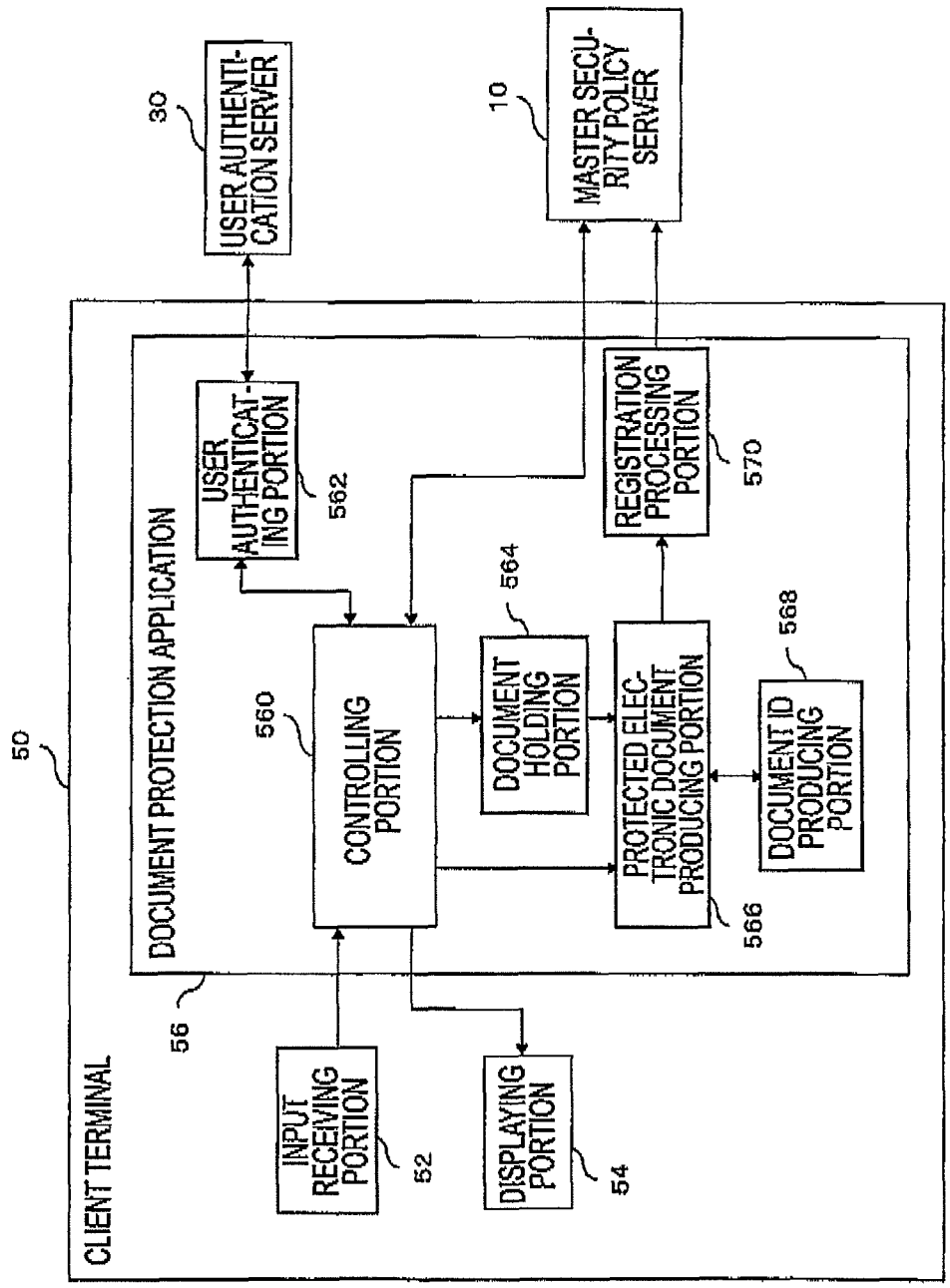
FIG. 5 is a block diagram schematically showing an example of the internal configuration of a client terminal of a master network.

FIG. 5 is a block diagram schematically showing an example of the internal configuration of the client terminal 50 of the master network 1. The client terminal 50 includes an input receiving portion 52, a displaying portion 54, and a document protection application 56.

The input receiving portion 52 receives information which is input by the user via an inputting apparatus (not shown) such as a keyboard or a mouse, and transfers the received input information to a controlling portion 560 of the document protection application 56.

The displaying portion 54 displays information which is to be presented to the user.

The document protection application 56 sets a security policy in an unprotected electronic document to produce a protected electronic document. The document protection application 56 includes the controlling portion 560, a user authenticating portion 562, a document holding portion 564, a protected electronic document producing portion 566, a document ID producing portion 568, and a registration processing portion 570.

In accordance with instructions which are obtained via the input receiving portion 52, the controlling portion 560 controls processes in the portions of the document protection application 56. The controlling portion 560 controls also contents of information to be displayed on the displaying portion 54.

The user authenticating portion 562 requests the user authentication server 30 to perform the user authentication, by using the user ID and authentication information which are obtained via the input receiving portion 52 and the controlling portion 560, and transfers an authentication result which is returned from the user authentication server in response to the request, to the controlling portion 560.

The document holding portion 564 is temporarily storing means for holding an unprotected electronic document that is an object in which a security policy is to be set.

With respect to the electronic document held in the document holding portion 564, the protected electronic document producing portion 566 produces a protected electronic document in which a security policy instructed by the controlling portion 560 is set.

Figure 6:
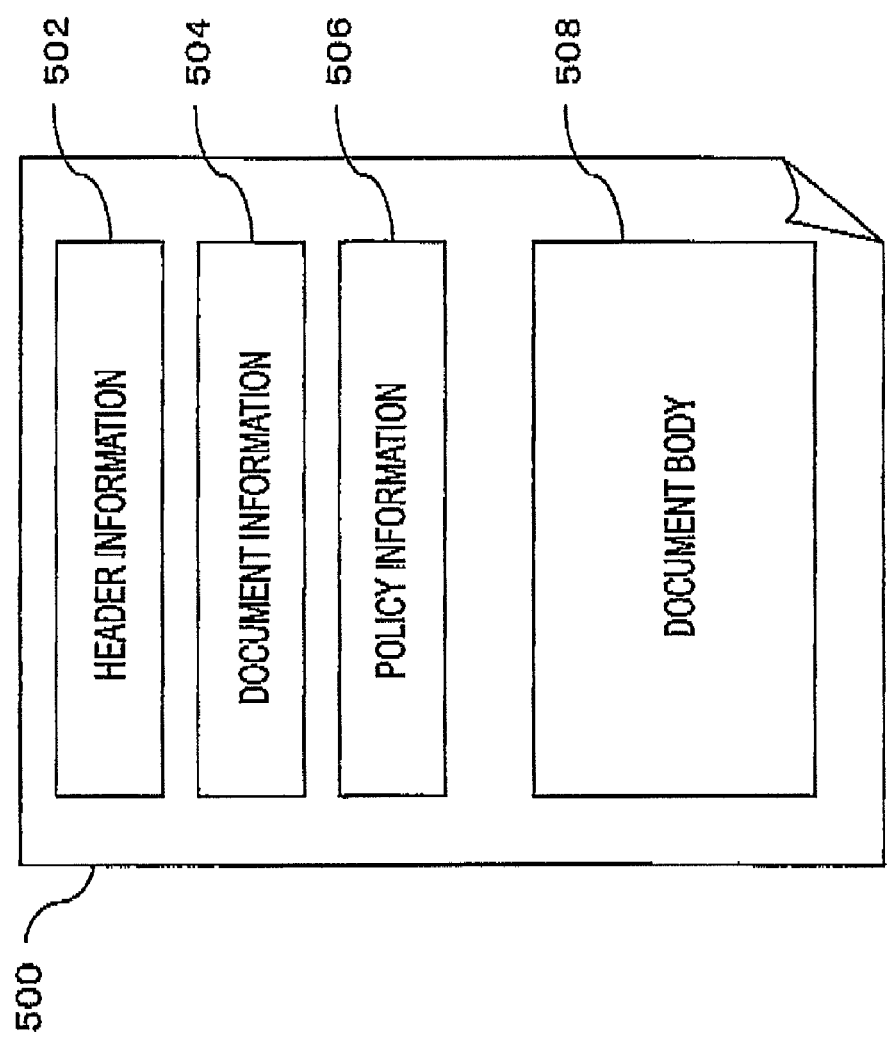
FIG. 6 is a view schematically showing an example of the data structure of a protected electronic document.

FIG. 6 shows an example of the data structure of the protected electronic document which is produced by the protected electronic document producing portion 566. Referring to FIG. 6, the protected electronic document 500 includes header information 502, document information 504, policy information 506, and a document body 508. The header information 502 is information indicating that the document is a protected electronic document. The document information 504 includes: the document ID which is produced by the document ID producing portion 568; the ID (producer ID) of the user who directs production of the protected electronic document 500, and the date and time of production of the protected electronic document 500. The policy information 506 contains the contents of the security policy which is instructed by the controlling portion 560. For example, the contents indicated by the record corresponding to one policy ID of the table of the example of FIG. 3 are contained as the policy information 506 in the protected electronic document 500. The document body 508 is encrypted data of the electronic document held in the document holding portion 564. In the example of the embodiment, the document body 508 of the protected electronic document 500 is encrypted by an encryption key which is common to all protected electronic documents 500 which are managed by the system. In another example, the document body 508 may be encrypted by using an encryption key which differs for each of the protected electronic documents 500. In order to prevent the protected electronic document 500 from being tampered, an electronic signature may be provided to the whole protected electronic document 500, or a value such as an HMAC (Keyed-Hashing for Message Authentication Code) which is used in the field of message authentication may be given.

Referring again to FIG. 5, in response to the request from the protected electronic document producing portion 566, the document ID producing portion 568 produces a new document ID, and transfers the produced document ID to the protected electronic document producing portion 566.

The registration processing portion 570 performs a process of registering the protected electronic document 500 which is produced by the protected electronic document producing portion 566, into the master security policy server 10. For example, the registration processing portion 570 gives a registration request containing: the document information 504 contained in the protected electronic document 500; and the policy ID in the policy information 506 contained in the protected electronic document 500, to the master security policy server 10.

Figure 7:
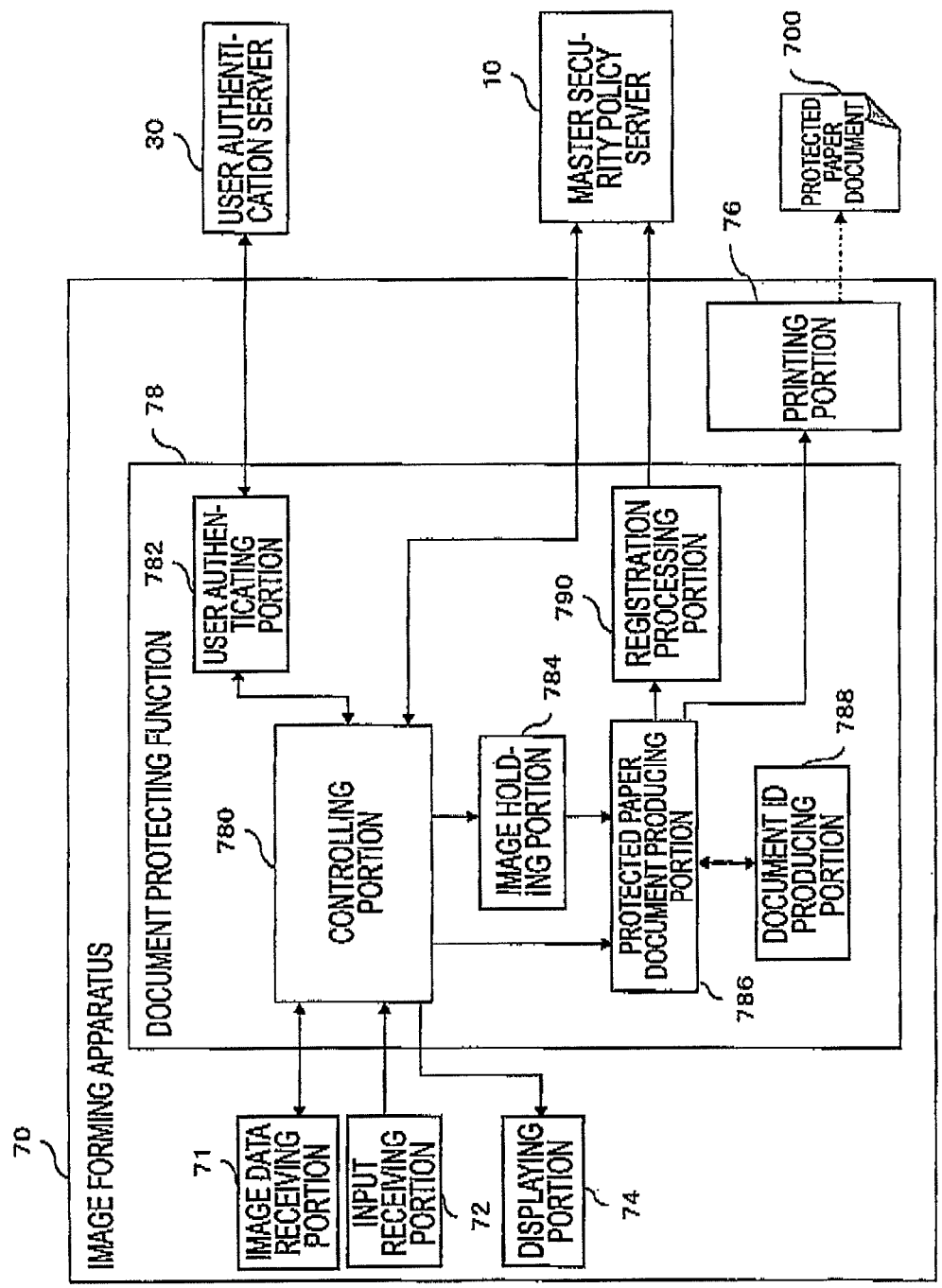
FIG. 7 is a block diagram schematically showing an example of the configuration of an image forming apparatus of the master network.

Next, referring to FIG. 7, the image forming apparatus 70 of the master network 1 will be described. FIG. 7 shows a schematic example of the configuration of the image forming apparatus 70. The image forming apparatus 70 reads an unprotected document by a scanner, sets a security policy, and produces a protected paper document.

Referring to FIG. 7, the image forming apparatus 70 includes an image data receiving portion 71, an input receiving portion 72, a displaying portion 74, a printing portion 76, and a document protecting function 78.

The image data receiving portion 71 receives an input of image data which are to be processed by the image forming apparatus 70. For example, the image data receiving portion 71 receives an input of image data of a paper document which are read by a scanner, and transfers the image data to a controlling portion of the document protecting function 78.

The input receiving portion 72 receives information which is input by the user via input buttons of an operation panel (not shown) or the like. The input receiving portion 72 transfers the received input information to the controlling portion of the document protecting function 78.

The displaying portion 74 displays information which is to be presented to the user. The displaying portion 74 is realized by a displaying apparatus such as a liquid crystal display.

The printing portion 76 prints image data onto a paper medium. The printing portion 76 may be an apparatus which realizes the printing function of a usual printer.

The document protecting function 78 sets a security policy in an unprotected paper document to produce a protected paper document. The document protecting function 78 includes a controlling portion 780, a user authenticating portion 782, an image holding portion 784, a protected paper document producing portion 786, a document ID producing portion 788, and a registration processing portion 790.

The controlling portion 780 controls processes of the portions of the document protecting function 78. The controlling portion 780 controls also the contents of information which is to be displayed on the displaying portion 74.

The user authenticating portion 782 requests the user authentication server 30 to perform user authentication, by using the user ID and authentication information which are obtained via the input receiving portion 72 and the controlling portion 780, and transfers an authentication result which is returned from the user authentication server 30 in response to the request, to the controlling portion 780.

The image holding portion 784 is temporarily storing means for holding image data that are obtained by reading an unprotected document in which a security policy is to be set, by a scanner (not shown).

With respect to the image data held in the image holding portion 784, the protected paper document producing portion 786 requests the document ID producing portion 788 to produce a document ID, and receives a produced document ID. Furthermore, the protected paper document producing portion sets a security policy instructed by the controlling portion 780, in the image data, and instructs the printing portion 76 to print a protected paper document, thereby producing a protected paper document 700.

Figure 8:
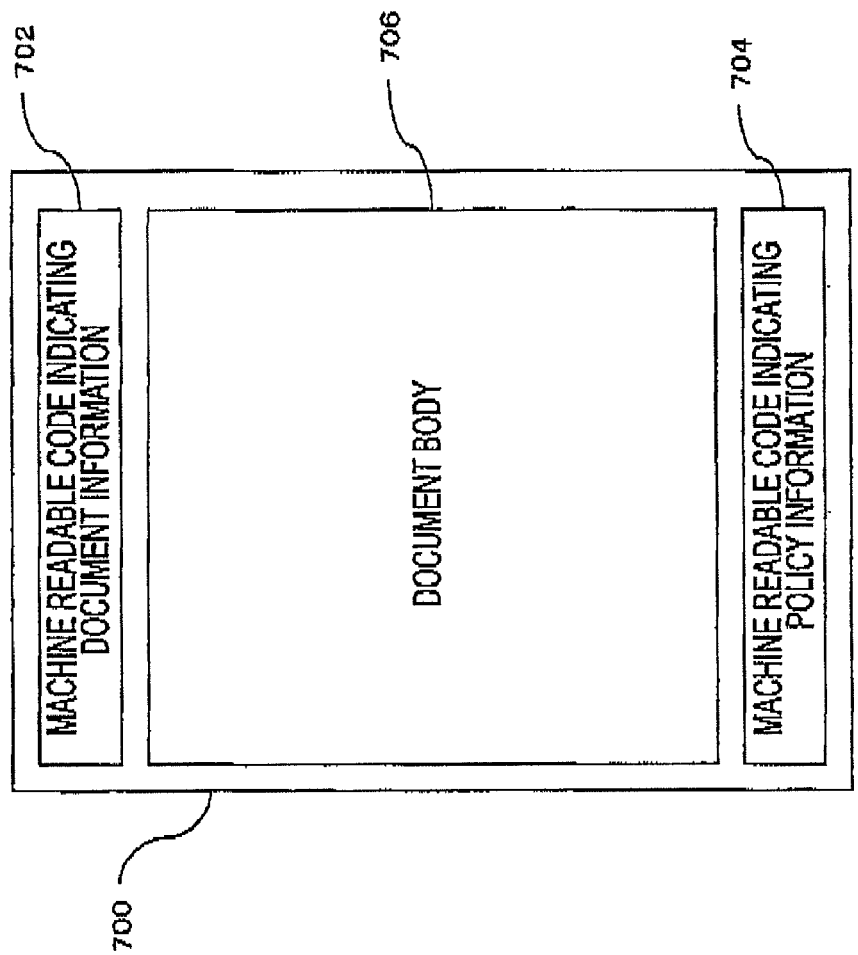
FIG. 8 is a view schematically showing an example of the configuration of a protected paper document.

As shown in FIG. 8, for example, the protected paper document 700 produced by the protected paper document producing portion 786 may be a paper document on which a machine readable code 702 indicating document information, a machine readable code 704 indicating policy information, and a document body 706 that are the image data held by the image holding portion 784 are printed. The contents of the document information and the policy information are identical with those which have been described above with respect to the protected electronic document. For example, the machine readable codes are codes which can be read by an information processing apparatus, such as bar codes or QR codes. The mode of the protected paper document is not restricted to the example of FIG. 8, and may be for example a document in which the document information and the policy information are printed while being embedded in a watermark-like manner. The specific mode of the protected paper document is not restricted to the above-described example as far as the document information and the policy information are printed on a sheet in a manner in which they can be read by an information processing apparatus.

Referring again to FIG. 7, in response to the request from the protected paper document producing portion 786, the document ID producing portion 788 produces a new document ID, and transfers the produced document ID to the protected paper document producing portion 786.

The registration processing portion 790 performs a process of registering the protected paper document produced by the protected paper document producing portion 786, into the master security policy server 10. The registration processing portion 790 issues a registration request which includes, for example, the document information of the protected paper document and the policy ID of the policy information of the protected paper document, to the master security policy server 10.

Although FIG. 7 shows the functions related to production of a protected paper document in the image forming apparatus 70, the image forming apparatus 70 may have other functions (not shown) not related to production of a protected paper document. For example, the image forming apparatus 70 may have a function of copying or scanning a protected paper document without producing the protected paper document. Alternatively, for example, the apparatus may have functions of receiving print instructions from the client terminal or the like, and printing an unprotected electronic document.

In the above, the apparatuses of the master network 1 have been described. Hereinafter, the apparatuses of the slave network 2 will be described.

The user authentication server 40 of the slave network 2 may be a server which is similar to the user authentication server 30 of the master network 1. Information related to a user who is to be controlled with respect to the use of a protected document is previously registered in the user authentication servers 30, 40 of the master network 1 and the slave network 2.

Figure 9:
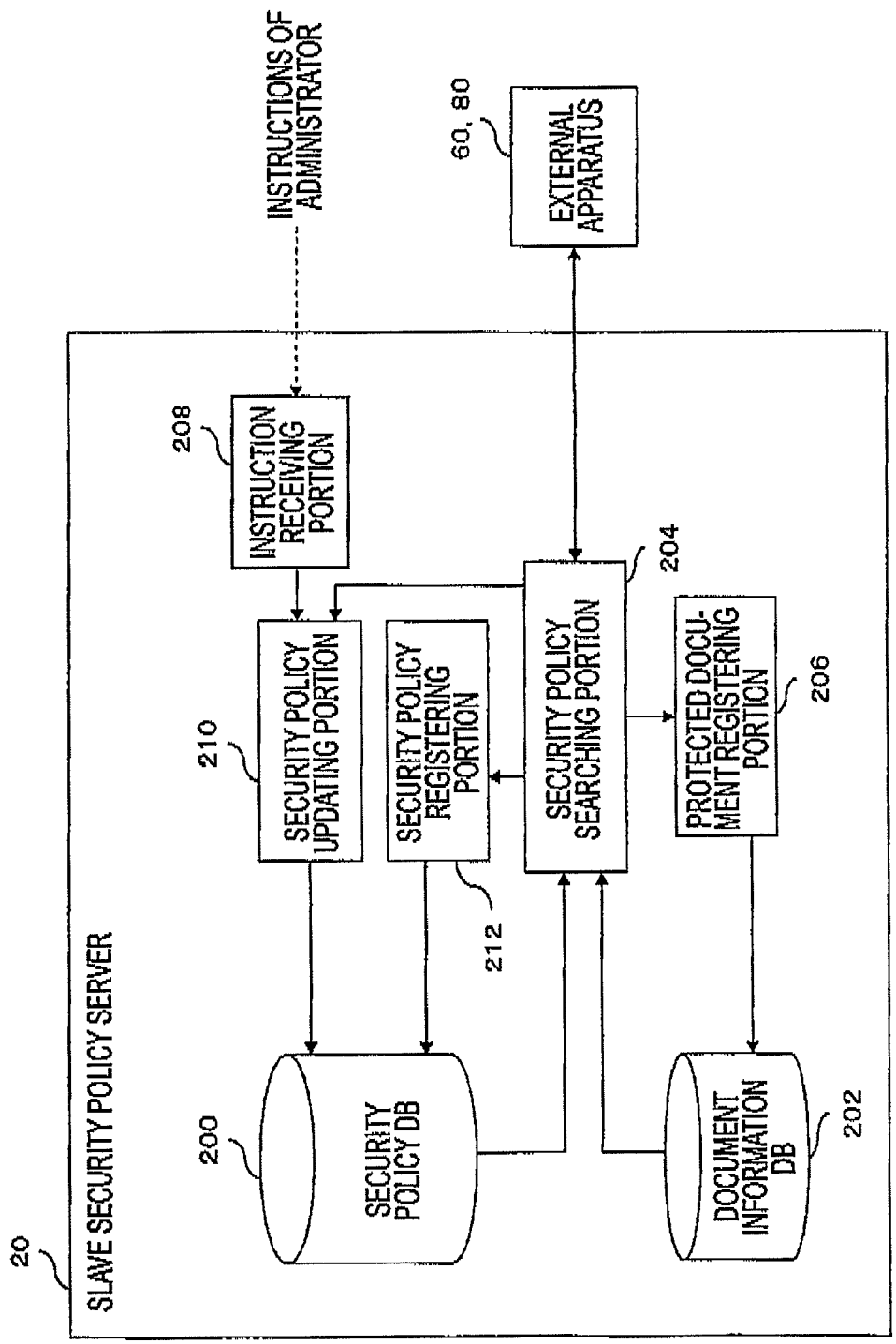
FIG. 9 is a block diagram schematically showing an example of the internal configuration of a slave security policy server.

FIG. 9 is a block diagram schematically showing an example of the internal configuration of the slave security policy server 20. The slave security policy server 20 includes a security policy DB 200, a document information DB 202, a security policy searching portion 204, a protected document registering portion 206, an instruction receiving portion 208, a security policy updating portion 210, and a security policy registering portion 212.

The security policy DB 200 is a database which stores information related to the security policy. The data structure of the security policy DB 200 is identical with that of the security policy DB 100 of the master security policy server 10.

The document information DS 202 is a database which stores information related to a protected document. The data structure of the document information DS 202 is identical with that of the document information DB 102 of the master security policy server 10.

In response to a security policy search request from an external apparatus such as the client terminal 60 or the image forming apparatus 80, the security policy searching portion 204 searches kinds of operations which are allowed to a user who wishes to use a protected document, by the security policy that is set in the protected document. When the protected document to be used is not registered in the document information DB 202, the security policy searching portion 204 instructs the protected document registering portion 206 to register the document information of the protected document. In accordance with a result of a comparison between the security policy indicated by the policy information in the protected document to be used and the security policy registered in the security policy DB 200, furthermore, the security policy searching portion 204 instructs the security policy registering portion 212 or the security policy updating portion 210 to perform a registration process or a updation process.

In accordance with the instructions from the security policy searching portion 204, the protected document registering portion 206 performs a process of registering the document information of the protected document which is not registered in the document information DB 202, into the document information DB 202.

The instruction receiving portion 208 receives instructions which are issued by the administrator or the like with respect to updation of security policies registered in the security policy DB 200. In the slave security policy server 20 of the example of the embodiment, a security policy is not newly registered into the security policy DB 200 in accordance with instructions from the administrator.

The security policy updating portion 210 updates the security policies registered in the security policy DB 200. In accordance with instructions which are obtained via the instruction receiving portion 208, for example, the security policy updating portion 210 updates the security policies in the security policy DB 200 in the same manner as the above-described process on the security policy updating portion 108 of the master security policy server 10. In accordance with the instructions from the security policy searching portion 204, furthermore, the security policy updating portion 210 of the slave security policy server 20 may sometimes update the security policies.

In accordance with the instructions from the security policy searching portion 204, the security policy registering portion 212 performs a process of registering an unregistered security policy into the security policy DB 200.

Figure 10:
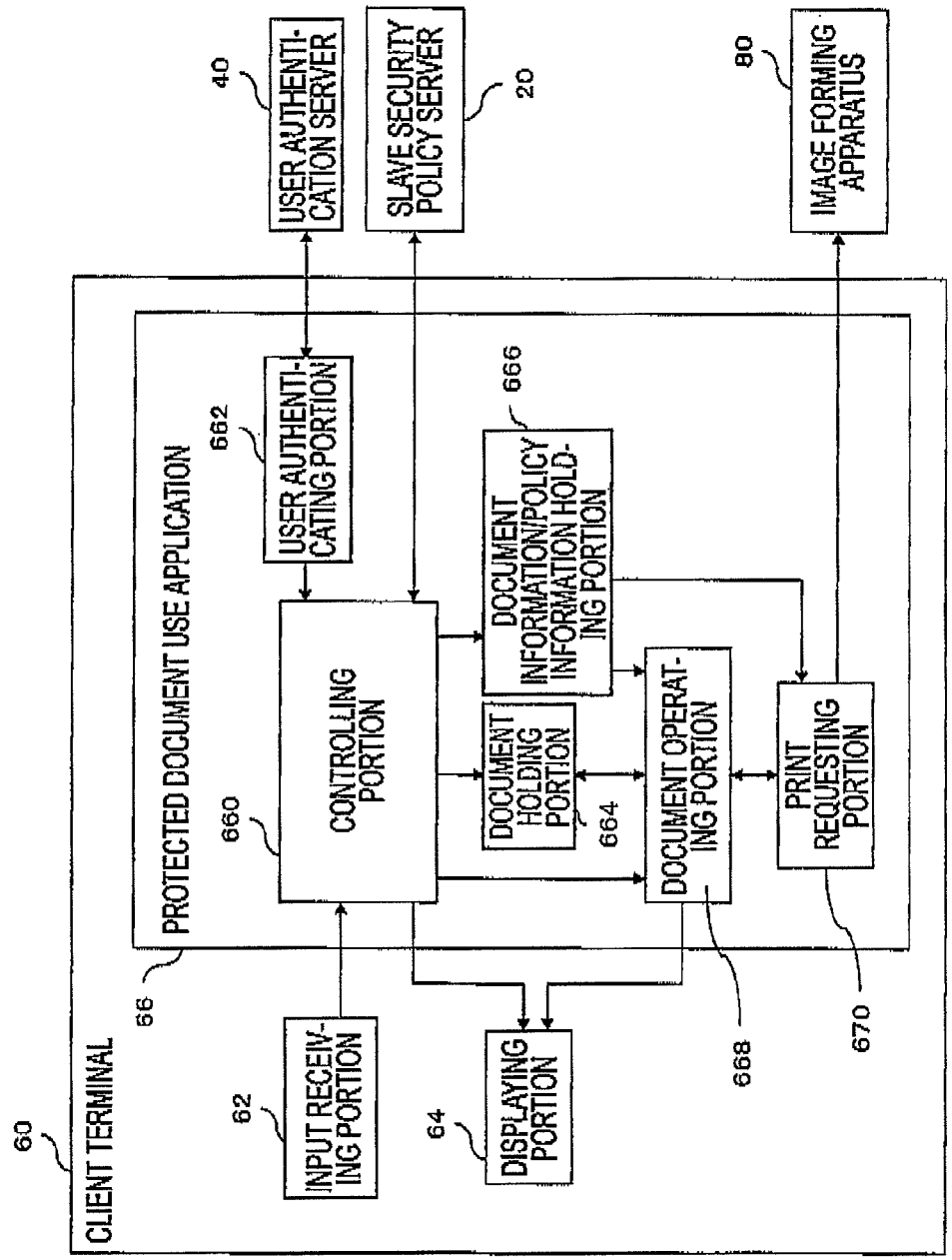
FIG. 10 is a block diagram schematically showing an example of the internal configuration of a client terminal of a slave network.

Referring to FIG. 10, the client terminal 60 of the slave network 2 will be described. FIG. 10 is a block diagram schematically showing an example of the internal configuration of the client terminal 60. The client terminal 60 exemplarily illustrated in FIG. 10 includes an input receiving portion 62, a displaying portion 64, and a protected document use application 66.

The input receiving portion 62 and the displaying portion 64 may be similar to the input receiving portion 52 and displaying portion 54 which have been described with respect to the client terminal 50 the master network 1, respectively.

The protected document use application 66 performs various operations with respect to a protected electronic document. The protected document use application 66 includes a controlling portion 660, a user authenticating portion 662, a document holding portion 664, a document information/policy information holding portion 666, a document operating portion 668, and a print requesting portion 670.

The controlling portion 660 controls processes of various portions of the protected document use application 66. Furthermore, the controlling portion 660 controls contents of information to be displayed on the displaying portion 64. When the controlling portion 660 receives instructions of an operation on a protected electronic document from a user via the input receiving portion 62, for example, the controlling portion issues a policy search request to the slave security policy server 20, and, in accordance with a result of the search, determines whether the operation on the protected electronic document can be performed or not.

The user authenticating portion 662 requests the user authentication server to perform user authentication by using the user ID and authentication information which are obtained via the input receiving portion 62 and the controlling portion 660, and transfers a result of the authentication which is returned from the user authentication server in response to the request, to the controlling portion 660.

The document holding portion 664 is temporarily storing means for holding the document body contained in a protected electronic document which is designated as an object of the operation.

The document information/policy information holding portion 666 is temporarily storing means for holding document information and policy information contained in the protected electronic document which is designated as an object of the operation.

The document operating portion 668 performs various operations with respect to a protected electronic document. The document operating portion 668 performs the operations only when the controlling portion 660 allows an operation to be performed on the protected electronic document.

In the case where the document operating portion 668 is to perform printing of a protected electronic document, the print requesting portion 670 issues a print request to the image forming apparatus.

Figure 11:
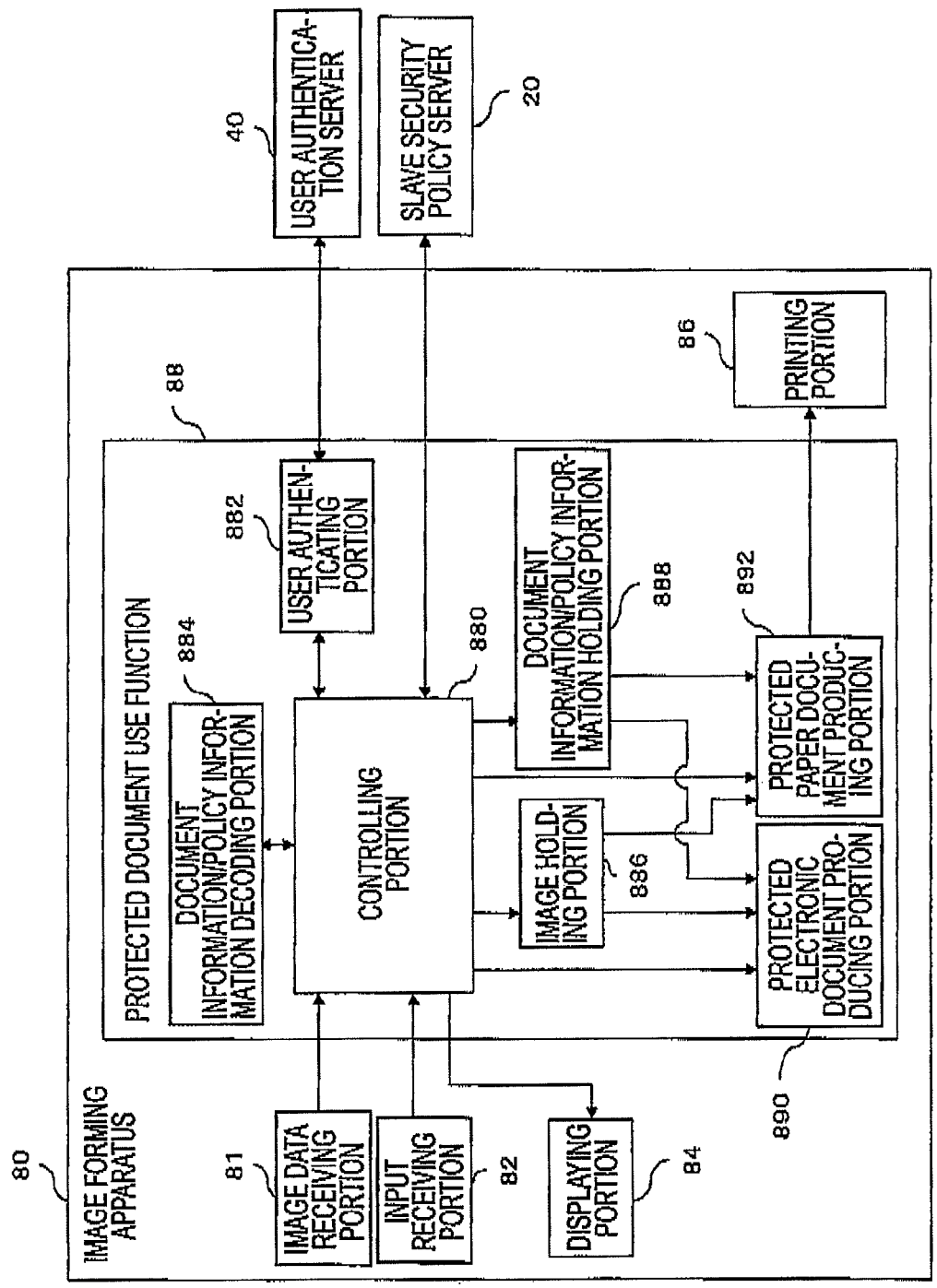
FIG. 11 is a block diagram schematically showing an example of the configuration of an image forming apparatus of the slave network.

FIG. 11 schematically shows an example of the configuration of the image forming apparatus 80 of the slave network 2. The image forming apparatus 80 exemplarily illustrated in FIG. 11 includes an image data receiving portion 81, an input receiving portion 82, a displaying portion 84, a printing portion 86, and a protected document use function 88.

The image data receiving portion 81, the input receiving portion 82, the displaying portion 84, and the printing portion 86 may be similar to the image data receiving portion 71, input receiving portion 72, displaying portion 74, and printing portion 76 which have been described with respect to the image forming apparatus 70 of the master network 1, respectively.

For example, the protected document use function 88 performs operations on a protected document such as printing of a protected electronic document, and scanning and copying of a protected paper document. The protected document use function 88 includes a controlling portion 880, a user authenticating portion 882, a document information/policy information decoding portion 884, an image holding portion 886, a document information/policy information holding portion 888, a protected electronic document producing portion 890, and a protected paper document producing portion 892.

The controlling portion 880 controls processes of various portions of the protected document use function 88. Furthermore, the controlling portion 880 controls contents of information to be displayed on the displaying portion 84. For example, the controlling portion 880 issues a policy search request with respect to a protected document to be processed, to the slave security policy server 20, and, in accordance with a result of the search, determines whether the operation on the protected document can be performed or not.

The user authenticating portion 882 requests the user authentication server 40 to perform user authentication by using the user ID and authentication information which are obtained via the input receiving portion 82 and the controlling portion 880, and transfers a result of the authentication which is returned from the user authentication server 40 in response to the request, to the controlling portion 880.

The document information/policy information decoding portion 884 processes codes indicating document information and policy information contained in image data which are obtained by reading a protected paper document by a scanner (not shown), to obtain the contents of the document information and the policy information.

The image holding portion 886 is temporarily storing means for holding image data of the document body of a protected document.

The document information/policy information holding portion 888 is temporarily storing means for holding document information and policy information contained in a protected document.

The protected electronic document producing portion 890 produces a protected electronic document corresponding to the protected paper document which is read by the scanner.

The protected paper document producing portion 892 performs a process of producing a protected paper document which is obtained as a result of copying of a protected paper document, or a protected paper document which is obtained as a result of printing of a protected electronic document.

Hereinafter, the operation of the document management system will be described.

Figure 12:
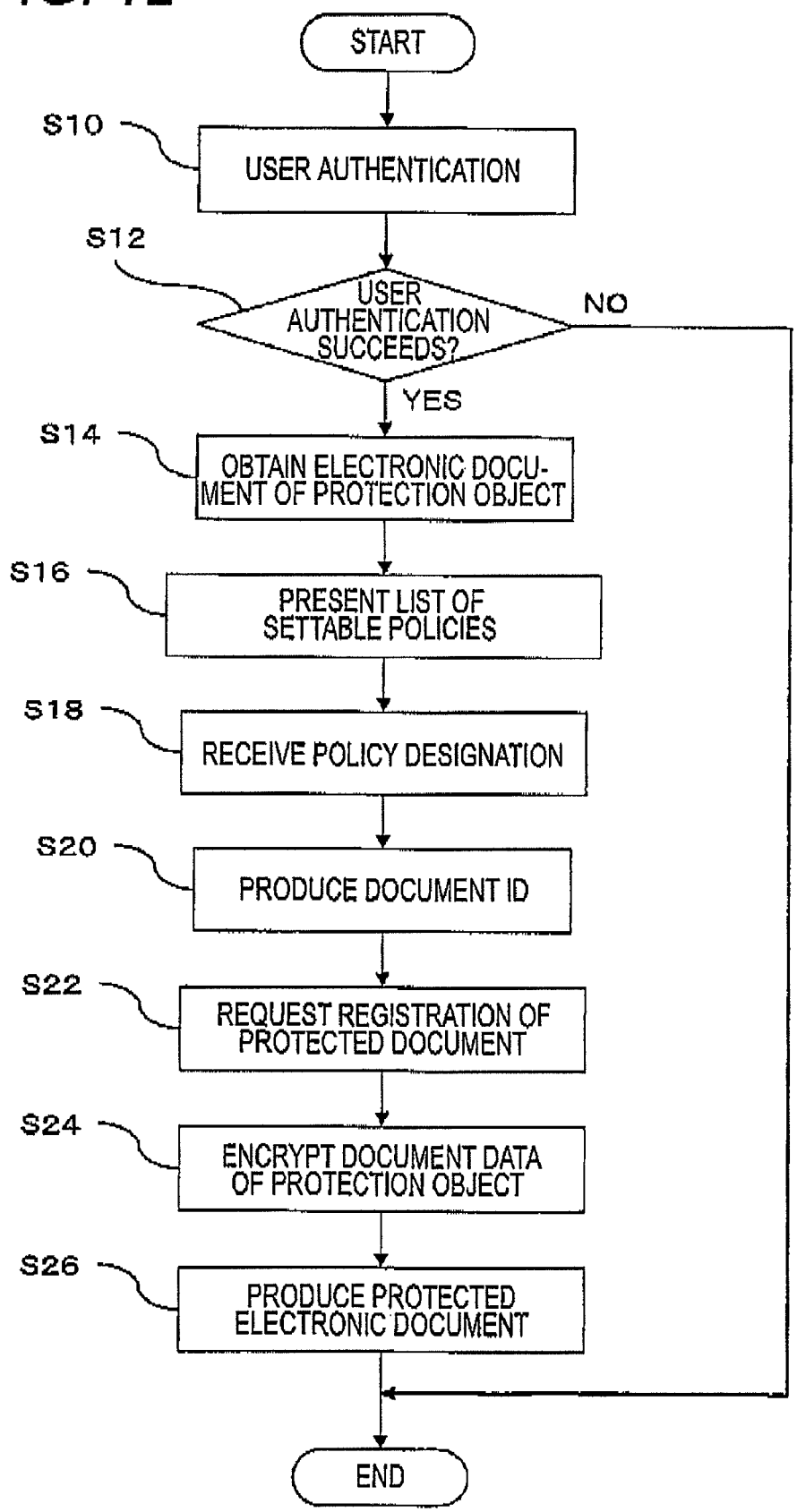
FIG. 12 is a flowchart showing an example of the procedure of a process of producing a protected electronic document.

FIG. 12 is a flowchart showing an example of the procedure of a process of producing a protected electronic document which is executed in the client terminal 50 of the master network 1. When the controlling portion 560 of the document protection application 56 disposed in the client terminal 50 receives protected electronic document production instructions designating an unprotected electronic document, via the input receiving portion 52, for example, the controlling portion starts the process of the procedure exemplarily illustrated in FIG. 12.

First, a user authentication process is performed (step S10). For example, the controlling portion 560 causes information prompting an input of a user ID and a password to be displayed on the displaying portion, obtains the user ID and password which are input by the user, via the input receiving portion 52, and causes the user authenticating portion 562 to perform the user authentication process. The user authenticating portion 562 issues an authentication request containing the user ID and password which are obtained via the input receiving portion 52 and the controlling portion 560, to the user authentication server 30, and transfers a result of the authentication from the user authentication server 30 to the controlling portion 560.

If the user authentication fails (NO in step S12), the process of the procedure of FIG. 12 is ended without performing the following steps. If the user authentication succeeds (YES in step S12), the controlling portion 560 obtains an electronic document which is a protection object (step S14). For example, the controlling portion obtains the electronic document designated by the protected electronic document production instructions, from a storage device which is not shown. The controlling portion 560 stores the obtained electronic document which is a protection object, into the document holding portion 564.

Next, the controlling portion 560 obtains a list of security policies which can be set, from the master security policy server 10, and causes the obtained list to be displayed on the displaying portion 54, thereby presenting the list to the user (step S16). In step S16, for example, the controlling portion 560 requests a list of security policies to the master security policy server 10. In response to the request, the security policy list replying portion 110 of the master security policy server 10 returns a list of security policies which are among those registered in the security policy DB 100, and which are valid (i.e., security policies in which the invalidation flag in the table of the example of FIG. 3 is "FALSE"), to the client terminal 50. In step S16, the controlling portion 560 may issue a request to the master security policy server 10 together with the user ID of the user who gives the production protected electronic document production instructions. In the example, the security policy list replying portion 110 of the master security policy server 10 changes the contents of the reply in accordance with the user ID. For example, a list of users who are allowed to produce a protected document may be previously stored in a storage device (not shown) of the master security policy server 10, and, only when the user ID which is received from the client terminal 50 is contained in the list, may return the list of security policies. Alternatively, with respect to each of security policies in the security policy DB 100, for example, a list of users who are allowed to produced a protected document in which the security policy is set may be previously stored, and a list of security policies which the user of the user ID that is received from the client terminal 50 is allowed to perform may be returned.

From the security policy list which is obtained from the master security policy server 10, and which is displayed on the displaying portion 54, the user selects the security policy which is to be set in the electronic document that is a protection object. The controlling portion 560 obtains instructions for selection of a security policy which is performed by the user, via the input receiving portion 52 (step S18).

The controlling portion 560 transfers the security policy designated by the selection instructions of the user, to the protected electronic document producing portion 566, and instructs a protected electronic document to be produced. The protected electronic document producing portion 566 which receives the instructions requests the document ID producing portion 568 to produce a new document ID. In response to the request, the document ID producing portion 568 produces a document ID (step S20), and transfers the produced document ID to the protected electronic document producing portion 566.

Then, the protected electronic document producing portion 566 transfers the document ID obtained from the document ID producing portion 568, the policy ID of the security policy received from the controlling portion 560, the user ID (producer ID) of the user who instructs the production, and the current time (date and time of production), to the registration processing portion 570. The registration processing portion 570 transmits the information received from the protected electronic document producing portion 566 to the master security policy server 10, and issues a request of registering a protected document (step S22). In response to the registration request, the protected document registering portion 112 of the master security policy server 10 newly registers a record which has information contained in the registration request as values of items, into the document information DB 102.

Next, the protected electronic document producing portion 566 encrypts the electronic document to be protected which is held by the document holding portion 564, by using a predetermined an encryption key (step S24). Then, the portion produces a protected electronic document in which the encrypted electronic document is set as a document body, and which contains the document information (the document ID, the producer ID, and the production date and time) and the policy information that is the contents of the security policy obtained from the controlling portion 560 (step S26). In the case where a protected electronic document corresponding to the second row of the table of the example of FIG. 4 is produced, for example, the protected electronic document contains, as document information, the document ID "40ffaaa4-0fb6-4634-85bf-bba45bc941b51", the producer ID "fx12345", and the production date and time "10:00 of Jan. 20, 2007", and, as policy information, information indicated by the record of the policy ID "0001" of the table of the example of FIG. 3. The controlling portion 560 stores the protected electronic document produced by the protected electronic document producing portion 566, into, for example, a storage device which is not shown. When step S26 is ended, the process of the procedure of the example of FIG. 12 is terminated.

Figure 13:
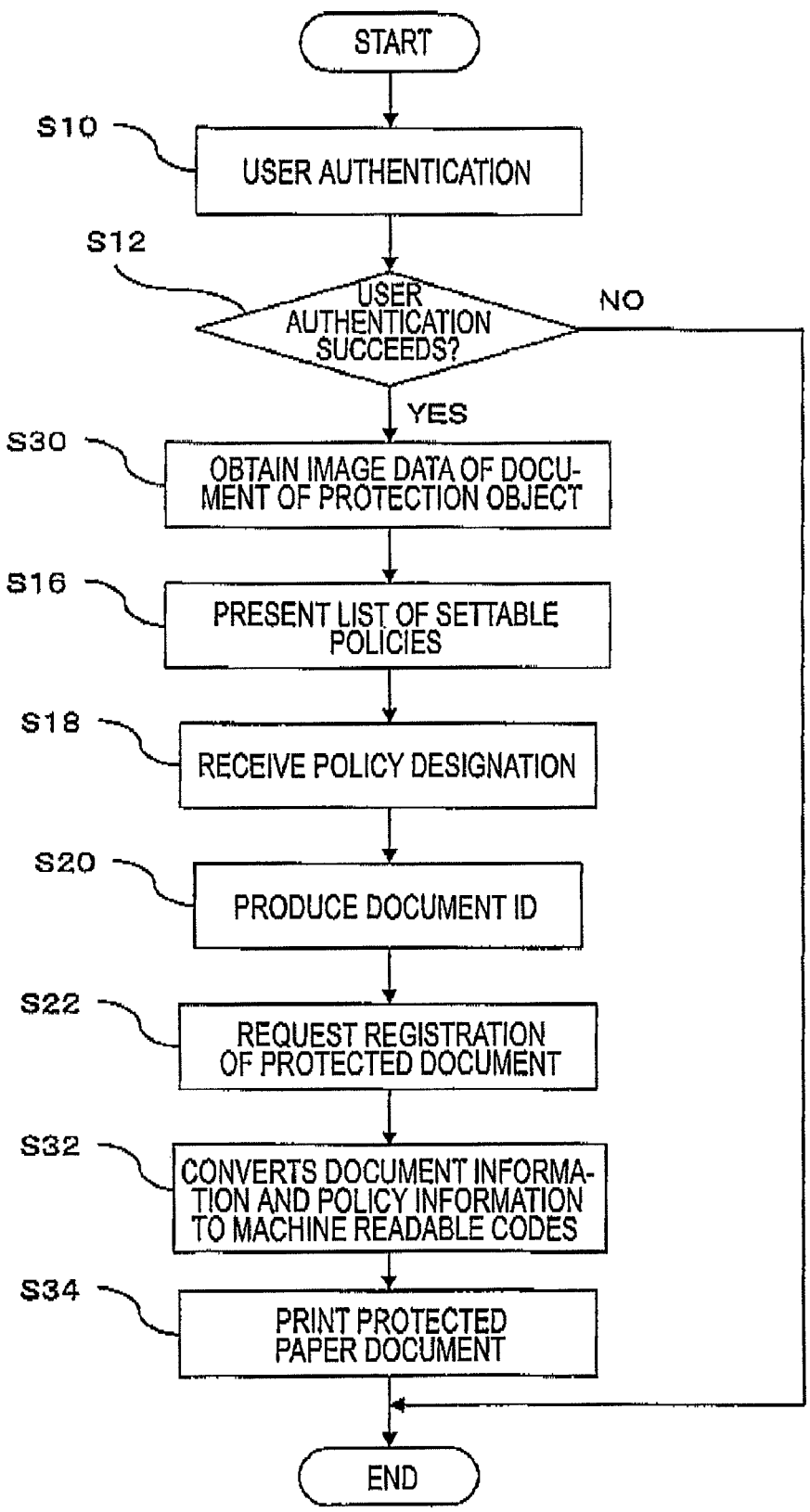
FIG. 13 is a flowchart showing an example of the procedure of a process of producing a protected paper document.

Next, an example of the procedure of the protected paper document production process which is performed in the image forming apparatus 70 of the master network 1 will be described with reference to FIG. 13. In FIG. 13, process steps which are identical with those of the flowchart of the example of FIG. 12 are denoted by the same reference numerals. For example, the controlling portion 780 of the document protecting function 78 disposed in the image forming apparatus 70 starts the process of the procedure exemplarily illustrated in FIG. 13 when, in the state where an unprotected paper document is placed in an automatic document feeding device (not shown) of the image forming apparatus 70 or a platen (not shown) for document reading in a scanner, the controlling portion receives from the user protected paper document production instructions via the input receiving portion 72.

Referring to FIG. 13, the user authentication process (step S10) and the determination whether or not the user authentication succeeds (step S12) are performed in a similar manner as the process steps denoted by the same reference numerals in FIG. 12.

If the user authentication fails (NO in step S12), the process is ended without performing the following steps.

If the user authentication succeeds (YES in step S12), the controlling portion 780 instructs the image data receiving portion 71 to read the unprotected paper document by the scanner, and obtains image data which are read from the paper document, from the image data receiving portion 71 (step S30). The controlling portion 780 stores the obtained image data into the image holding portion 784.

In a similar manner as the process which have been described with respect to steps S16 to S22 of FIG. 12, then, the protected paper document producing portion 786, the document ID producing portion 788, and the registration processing portion 790 perform the presentation of the list settable policies (step S16), the reception of policy designation (step S18), the production of the document ID (step S20), and the request of registration of the protected document (step S22). Thereafter, the protected paper document producing portion 786 converts the document information and the policy information to machine readable codes (step S32).

Thereafter, the protected paper document producing portion 786 instructs the printing portion 76 to print the machine readable codes indicating the document information and the policy information, and the image data held by the image holding portion 784, on a sheet. In accordance with the instructions, the printing portion 76 performs a print process to produce a protected paper document (step S34). When step S34 is ended, the process of the procedure of the example of FIG. 13 is terminated.

The protected electronic document which is produced by the process of the procedure of the example of FIG. 12, and the protected paper document which is produced by the process of the procedure of the example of FIG. 13 are used by the client terminal 60 and the image forming apparatus 80 of the slave network 2, respectively. The use of a protected document is restricted in accordance with a result of the policy search process which is performed by the slave security policy server 20 with respect to the protected document in response to a request from the client terminal 60 or the image forming apparatus 80.

Figure 14:
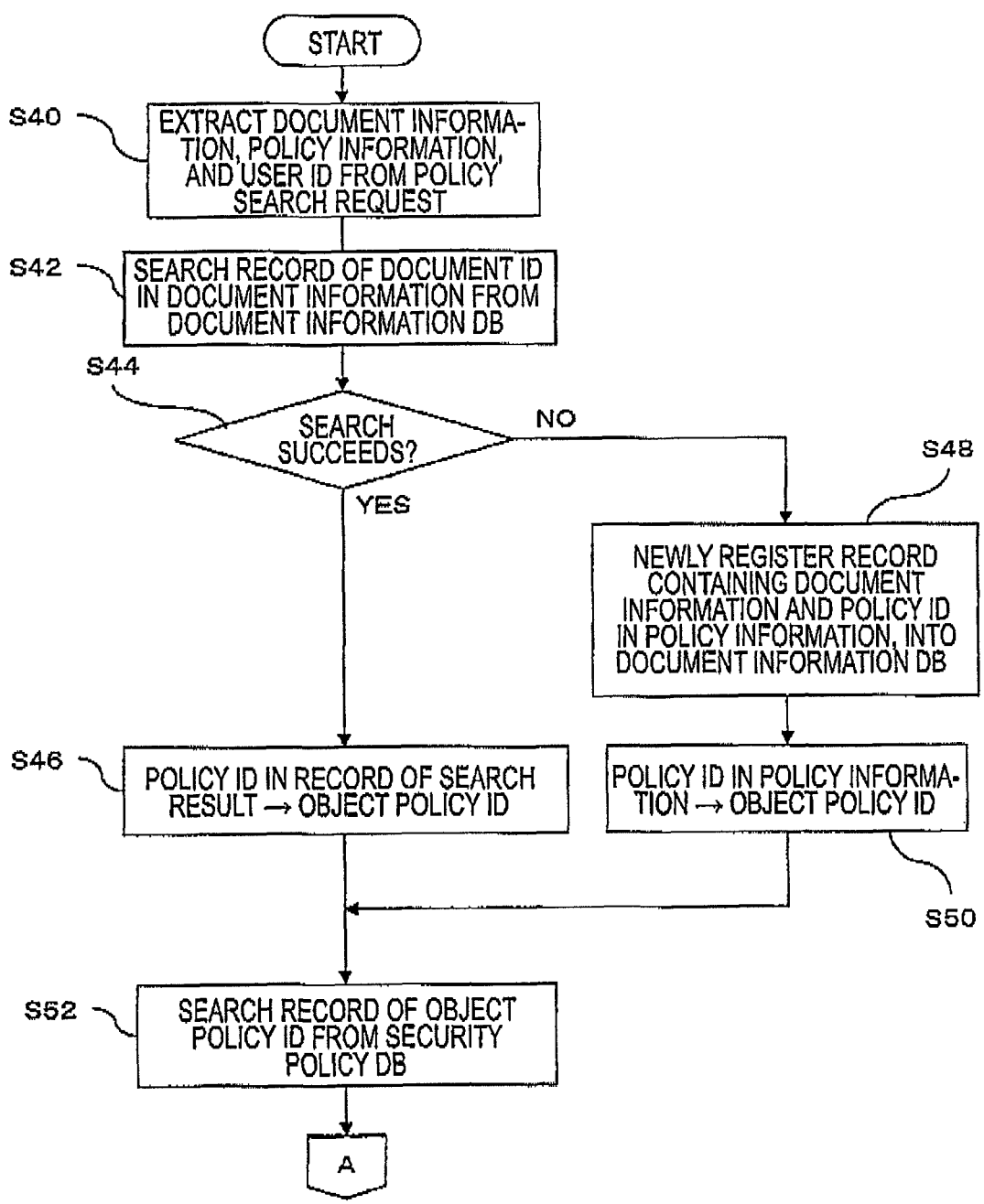
FIG. 14 is a flowchart showing an example of a partial procedure of a process of searching a policy.
Figure 15:
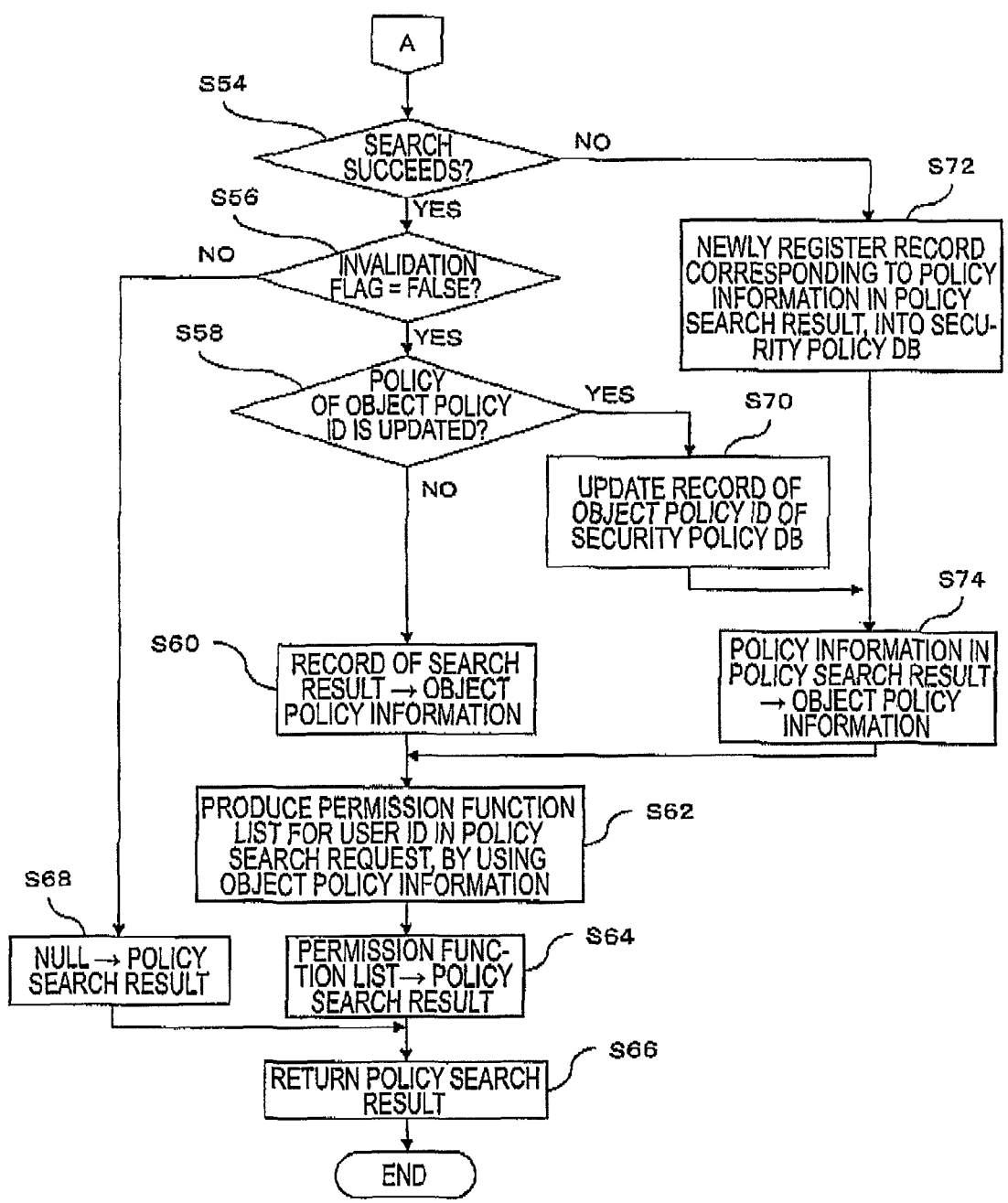
FIG. 15 is a flowchart showing an example of a partial procedure of the process of searching a policy.

Referring to FIGS. 14 and 15, an example of the procedure of the policy search process which is performed by the slave security policy server 20 of the slave network 2 will be described. For example, the policy search process is performed in the case where the slave security policy server 20 receives, from the client terminal 60 or the image forming apparatus 80, a request (policy search request) for inquiring information related to a security policy which is set in a protected document to be used in the client terminal 60 or the image forming apparatus 80. In the following description, it is assumed that the policy search request contains the user ID of a user who wishes to use a protected document, the document information of the protected document, and the policy information of the protected document.

In the slave security policy server 20, the security policy searching portion 204 which receives the policy search request starts the process of the procedure exemplarily illustrated in FIG. 14.

Referring to FIG. 14, first, the security policy searching portion 204 extracts the user ID, the document information, and the policy information from the policy search request (step S40). Then, the portion searches the record of the document ID contained in the extracted document information (step S42). If the search succeeds (YES in step S44), the security policy searching portion 204 sets the policy ID in the record of the search result from the document information DB 202, as an object policy ID (step S46).

If the search in step S42 fails (NO in step S44), the security policy searching portion 204 transfers the document information (the document ID, the producer ID, and the production date and time) extracted from the policy search request, and the policy ID of the policy information extracted from the policy search request to the protected document registering portion 206, and instructs the protected document registering portion to register a record containing these sets of information into the document information DB 202. The protected document registering portion 206 which receives the instructions newly produces a record in the document information DB 202, and sets the document information and the policy ID received from the security policy searching portion 204, as the values of the items (see FIG. 4) of the newly produced record (step S48). Thereafter, the security policy searching portion 204 sets the policy ID contained in the policy information extracted from the policy search request, as the object policy ID (step S50).

When the object policy ID is set in step S46 or S50, the security policy searching portion 204 searches the record of the object policy ID from the security policy DB 200 (step S52). After step S52, the process proceeds to step 354 of FIG. 15.

Referring to FIG. 15, if the search of step S52 of FIG. 14 succeeds (YES in step S54), the value of the invalidation flag of the record of the search result from the security policy DB 200 is checked (step S56). If the value of the invalidation flag is set to "TRUE" (NO in step S56), the policy search result is set "NULL" (step S68). If the value of the invalidation flag is set to "FALSE" (YES in step S56), it is determined whether the contents of the record of the object policy ID in the security policy DB 200 is to be updated or not (step S58). The determination is performed by comparing the update date and time of the record of the search result from the security policy DB 200 with that contained in the policy information extracted from the policy search request. If the update date and time of the policy information extracted from the policy search request is later, it is determined that the corresponding record in the security policy DB 200 is to be updated. If not, it is determined that the updation is not performed.

If it is determined that the updation of the record of the object policy ID is not performed (NO in step S58), the security policy searching portion 204 sets the contents of the record of the search result from the security policy DB 200, as object policy information (step S60).

If it is determined that the updation of the record of the object policy ID is to be performed (YES in step S58), the security policy searching portion 204 transfers the policy information extracted from the policy search request to the security policy updating portion 210, and instructs the security policy updating portion to update the corresponding record. The security policy updating portion 210 which receives the instructions rewrites the values of the items of the record of the object policy ID to those contained in the policy information obtained from the security policy searching portion 204 (i.e., the policy information extracted from the policy search request), thereby updating the corresponding record (step S70). Thereafter, the security policy searching portion 204 sets the policy information extracted from the policy search request, as the object policy information (step S74).

In the above, the process procedure in the case where the search (step S52 of FIG. 14) of the record of the object policy ID from the security policy DB 200 succeeds (YES in step S54) has been described. If the search of the record of the object policy ID fails (NO in step S54), the security policy searching portion 204 transfers the policy information extracted from the policy search request to the security policy registering portion 212, and instructs the security policy registering portion to register the record corresponding to the policy information into the security policy DB 200. The security policy registering portion 212 which receives the instructions produces a new record in the security policy DB 200, and sets the values contained in the policy information received from the security policy searching portion 204, as the values of the items of the new record (step S72). Thereafter, the security policy searching portion 204 sets the policy information extracted from the policy search request, as the object policy information (step S74).

When the object policy information is set in step S60 or S74, the security policy searching portion 204 produces a permission function list for the user of the user ID extracted from the policy search request (hereinafter, such a user ID is referred to as requester ID) (step S62).

In step S62, for example, the security policy searching portion 204 searches information corresponding to the requester ID in the usable range included in the object policy information. In the case where the object policy information is a security policy of policy ID "0001" of the table of the example of FIG. 3, for example, in the object policy information, "Name of organization: Software development department", "Development contractor: User A, User B", and "Producer" are set as the usable range. In this example, in the case where the user of the requester ID belongs to "Software development department" and the requester ID is different from the producer ID, the usable range "Name of organization: Software development department" is searched. At this time, for example, information related to the group to which the user of the requester ID belongs may be obtained by inquiring of the user authentication server. When information corresponding to the requester ID is searched from the usable range of the object policy information, the validity period associated with the searched usable range is checked, and it is determined whether the current time is within the validity period or not. For example, it may determined whether the elapsed time from the production date and time contained in the document information extracted from the policy search request to the current time is within the period which is set as the validity period. If within the validity period, the permission function list associated with the searched usable range is set as a permission function list for the user of the requester ID. In the above-described example in which the usable range "Name of organization: Software development department" is searched from the object policy information that is policy ID "0001", when the elapsed time from the production date and time of the document information in the policy search request is within the corresponding validity period "180 days", the permission function list ("Browsing of electronic document", "Printing of electronic document", and "Copying of paper document") corresponding to the usable range is set as the permission function list for the requester ID.

If the usable range corresponding to the requester ID is not searched in step S62 from the object policy information, or if the validity period of the searched usable range has elapsed, the permission function list corresponding to the requester ID is set to NULL.

If, in step S62, a plurality of usable ranges corresponding to the requester ID are contained in the object policy information, a list containing all kinds of operations included in permission function lists respectively associated with the usable ranges which are within the validity range is set as the permission function list for the requester ID. In the case where the policy ID of the object policy information is "0001", the requester ID is identical with the producer ID, and the user of the requester ID belongs to "Software development department", for example, a list containing all kinds of operations (browsing, edition, and printing of an electronic document, and copying and scanning of a paper document) included in permission function lists respectively associated with the corresponding usable ranges "Name of organization: software development department" and "Producer" may be set as the permission function list for the requester ID. In another example, with respect to a permission function list associated with plural corresponding usable ranges, a list which is combined by the AND conditions may be set as the permission function list for the requester ID. In the above-described example in which the object policy information has the policy ID "0001" and the usable range corresponding to requester ID is two usable ranges "Name of organization. Software development department" and "Producer" correspond to the requester ID, the kinds of operations ("Browsing of electronic document", "printing of electronic document", and "Copying of paper document") contained in both the permission function lists respectively associated with the two usable ranges may be set as the permission function list for the requester ID.

The security policy searching portion 204 sets the permission function list produced in step S62 as the policy search result (step S64).

When the policy search result is set in step S64 or S68, the security policy searching portion 204 returns the policy search result to the client terminal 60 or image forming apparatus 80 which is the request source of the policy research request (step S66). After step S66, the policy search process is ended.

Figure 16:
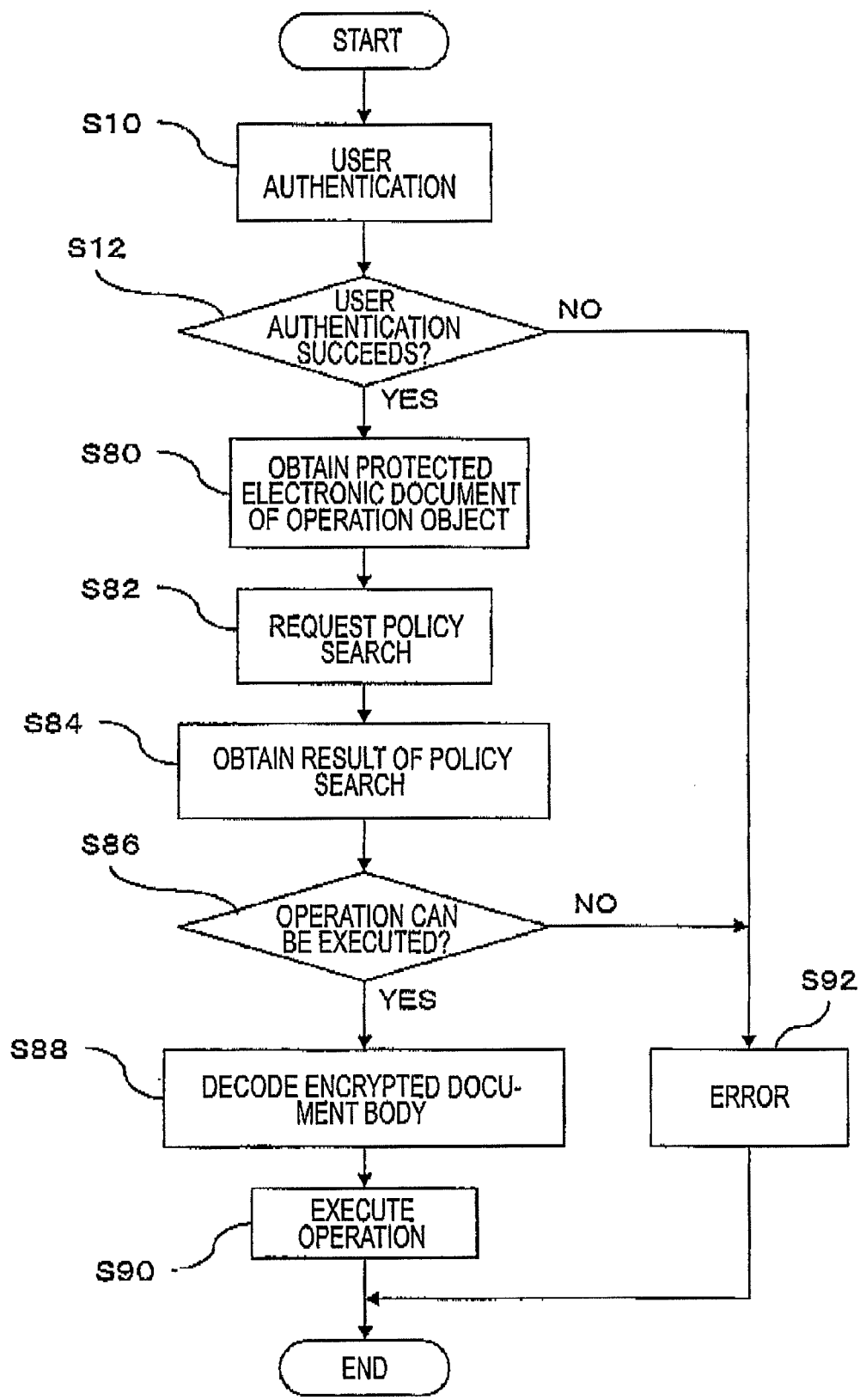
FIG. 16 is a flowchart showing an example of the procedure of a process of using a protected electronic document.

FIG. 16 is a flowchart showing an example of the procedure of a process which is performed in the case where operations are executed on a protected electronic document in the client terminal 60 of the slave network 2. When the controlling portion 660 of the protected document use application 66 of the client terminal 60 receives from user operation instructions designating a protected electronic document via the input receiving portion 62, for example, the controlling portion starts the process of the procedure exemplarily illustrated in FIG. 16.

Referring to FIG. 16, the user authentication process (step S10) and the determination whether or not user authentication succeeds (step S12) are performed in a similar manner as steps S10 and S12 of FIGS. 12 and 13.

If the user authentication fails (NO in step S12) an error process (step S92) is performed to terminate the process. In the error process, for example, the controlling portion 660 displays a message indicating that the user authentication fails, on the displaying portion 64.

If the user authentication succeeds (YES in step S12), the controlling portion 660 obtains a protected electronic document which is designated as an object of the operation (step S80). Then, the controlling portion 660 extracts document information and policy information from the protected electronic document, and issues a policy search request containing the extracted document information and policy information, and the user ID of the user which performs the operation instructions, to the slave security policy server 20 (step S82). In response to this, the slave security policy server 20 performs the policy search process which has been described with reference to FIGS. 14 and 15. Then, the controlling portion 660 obtains the policy search result returned from the slave security policy server 20 (step S84), and determines whether the kind of the operation designated in the operation instructions of the user is included in the policy search result or not, thereby determining whether the operation can be executed or not (step S86).

If the designated operation kind is included in the policy search result, the controlling portion 660 determines that the execution of the operation is allowed (YES in step S86), decodes the encrypted document body contained in the protected electronic document, by using a predetermined decode key, and stores data of a result of the decoding into the document holding portion 664 (step S88). Furthermore, the controlling portion 660 stores document information and policy information contained in the protected electronic document into the document information/policy information holding portion 666. Then, the controlling portion 660 instructs the document operating portion 668 to execute the designated operation, and the document operating portion 668 executes the operation (step S90).

An example of the operation which is executed in step S90 will be described. For example, it is assumed that the designated operation is browsing. The document operating portion 668 causes the decoded document body held by the document holding portion 664, to be displayed on the displaying portion 64. In the case where an editing operation is instructed, the document operating portion 668 causes the document body which is held by the document holding portion 664, to be displayed on the displaying portion 64, and receives edition by the user via the input receiving portion 62 and the controlling portion 660 to reflect the received edition contents in the document body held by the document holding portion 664. When, after the edition, "Storing" of the protected electronic document is instructed by the user via the input receiving portion 62 and the controlling portion 660, the document operating portion 668 encrypts the data of the document body in the document holding portion 664, by a predetermined encryption key. Then, a protected electronic document which contains the encrypted data as the document body, and further the document information and policy information held by the document information/policy information holding portion 666 is produced.

In the case where the kind of the designated operation is printing, for example, the document operating portion 668 transfers in step S90 the document body held by the document holding portion 664 and the document information and policy information held by the document information/policy information holding portion 666 to the print requesting portion 670. The print requesting portion 670 issues a print request containing the transferred document body, document information, and policy information to the image forming apparatus 80. In the image forming apparatus 80 which receives the print request, the controlling portion 880 of the protected document use function 88 converts the document information and policy information in the print request to machine readable codes by means of the document information/policy information decoding portion 884, transfers image data of the document body in the print request to the image holding portion 886, and then instructs the protected paper document producing portion 892 to produce a protected paper document. The protected paper document producing portion 892 instructs the printing portion 86 to print the image data held by the image holding portion 886 and the document information and policy information which have been converted to machine readable codes, on a sheet. In accordance with the instructions, the printing portion 86 performs a printing process. Therefore, a protected paper document which is as a result of printing the protected electronic document in response to the print request from the client terminal 60 is produced.

Returning to the description of the flowchart of the example of FIG. 16, if, in step S86, the kind of the designated operation is not included in the policy search result, the controlling portion 660 determines that the execution of the operation is not allowed (NO in step S86), and the error process (step S92) is performed to terminate the process. In the error process in this case, for example, a message indicating that the execution of the designated operation is not allowed is displayed on the displaying portion 64.

In the process related to the use of a protected electronic document which has been described with reference to FIG. 16, in the case where a user instructs an operation of printing a protected electronic document to be performed, the client terminal 60 determines whether the printing operation can be performed or not. In another example, in the case where an operation of printing a protected electronic document is instructed, the image forming apparatus 80 may determine whether the printing operation can be performed or not, in place of the client terminal 60. In this example, in the process of the procedure of the example of FIG. 16, for example, the controlling portion 660 of the protected document use application 66 of the client terminal 60 determines whether the kind of the instructed operation is printing or not, after the obtaining of the protected electronic document which is the operation object (step S80). If printing, the controlling portion controls the print requesting portion 670 to issue a print request containing the protected electronic document of the operation object (print object) and the user ID of the user who instructs the printing, to the image forming apparatus 80. In response to the print request, in a manner similar to steps S82 and S84 of the procedure of the example of FIG. 16, the controlling portion 880 of the protected document use function 88 disposed in the image forming apparatus 80 issues a policy search request to the slave security policy server 20, and obtains the policy search result, by using the policy information and user ID contained in the print request. If the printing operation is contained in the permission function list which is the obtained policy search result, the controlling portion 880 performs a process of decoding the encrypted document body of the protected electronic document which is being requested to be printed, converts the document information and policy information to machine readable codes by means of the document information/policy information decoding portion 884, and then controls the protected paper document producing portion 892 so as to perform the printing process. If the printing operation is not contained in the policy search result, the controlling portion 880 does not perform the printing operation. In this example, in the case where the kind of the operation instructed in the client terminal 60 is not printing, the processes of step S82 and subsequent steps of the procedure of the example of FIG. 16 are performed in the protected document use application 66 of the client terminal 60.

Figure 17:
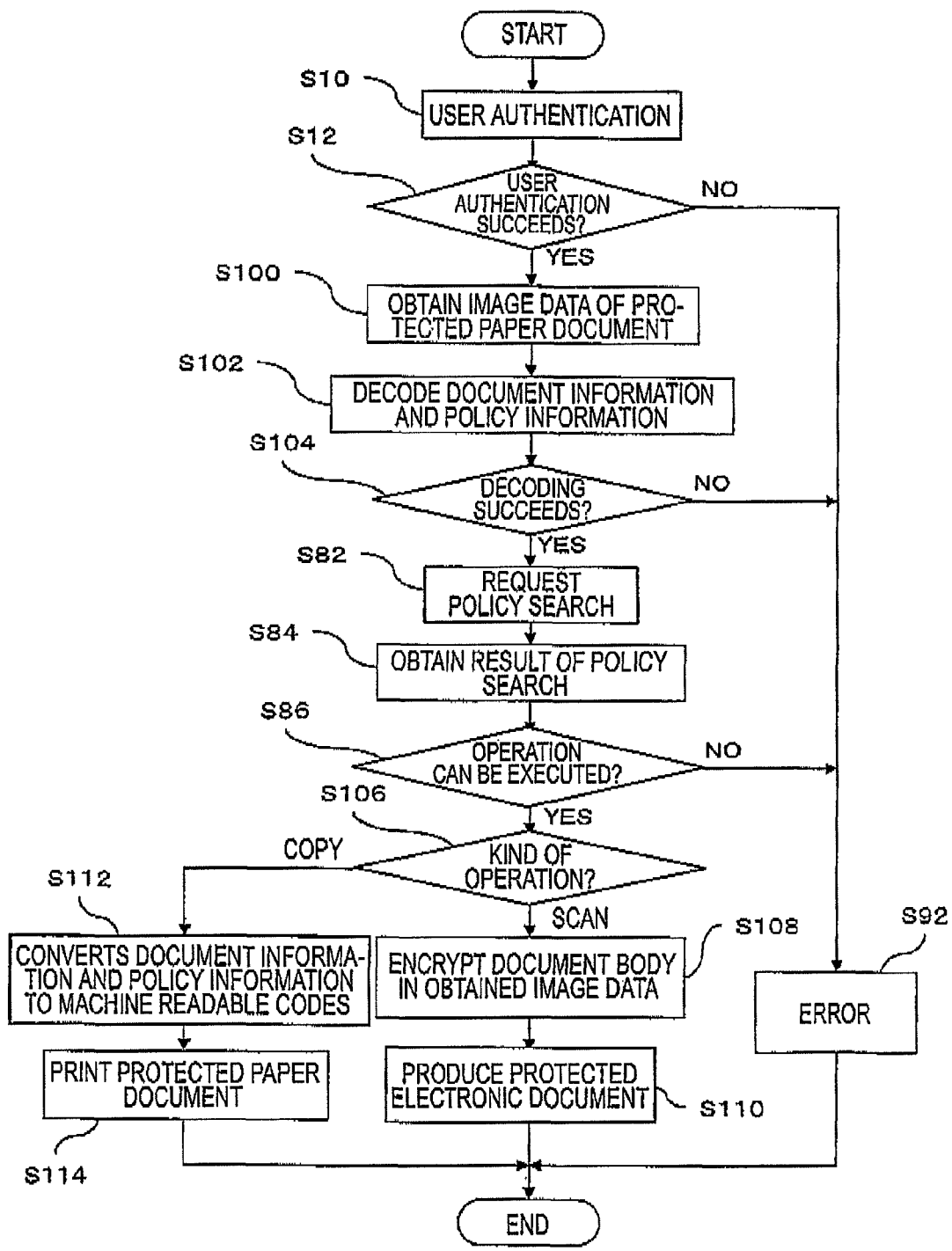
FIG. 17 is a flowchart showing an example of the procedure of a process of using a protected paper document.

FIG. 17 is a flowchart showing an example of the procedure of a process which is performed in the case where operations are executed on a protected paper document in the image forming apparatus 80 of the slave network 2. In FIG. 17, process steps which are identical with those of the flowchart of the example of FIG. 16 are denoted by the same reference numerals. For example, the controlling portion of the protected document use function 88 disposed in the image forming apparatus 80 starts the process of the procedure exemplarily illustrated in FIG. 17 when, in the state where a protected paper document is placed in an automatic document feeding device (not shown) of the image forming apparatus 80 or a platen (not shown) for document reading in a scanner, the controlling portion receives protected paper document production instructions (in this example, instructions for copying or scanning) from the user via the input receiving portion 82.

Referring to FIG. 17, the user authentication process (step S10) and the determination whether or not the user authentication succeeds (step S12) are performed in a similar manner as steps S10 and S12 of FIG. 16.

If the user authentication fails (NO in step S12), an error process (step S92) is performed to terminate the process.

If the user authentication succeeds (YES in step S12), the controlling portion 880 instructs the image data receiving portion 81 to read the protected paper document by the scanner, and obtains image data which are read from the protected paper document, from the image data receiving portion 81 (step S100). Then, the controlling portion extracts machine readable codes indicating document information, and those indicating policy information from the obtained image data, causes the document information/policy information decoding portion 884 to decode the extracted machine readable codes to obtain the contents of the document information and policy information (step S102). The obtained document information and policy information are stored into the document information/policy information holding portion 888. Furthermore, a portion corresponding to the document body in the image data which are obtained by reading the protected paper document is stored into the image holding portion 886

If the decoding process fails (NO in step S104), an error process (step S92) is performed, and thereafter the process is terminated.

If the decoding process succeeds (YES in step S104), a policy search request containing the obtained document information and policy information and the user ID of the user who instructs the operation is issued to the slave security policy server 20 (step S82). In a similar manner as steps S84 and S86 of the example of FIG. 16, thereafter, a result of a policy search is obtained (step S84), and it is determined whether the operation can be executed or not (step S86).

If it is determined that the execution of the operation is not allowed (NO in step S86), the error process (step S92) performed to terminate the process.

If it is determined that the execution of the operation is allowed (YES in step S86), the controlling portion 880 determines the kind of the designated operation (step S106).

If the kind of the operation is scanning, the controlling portion 880 instructs the protected electronic document producing portion 890 to produce a protected electronic document. The protected electronic document producing portion 890 which receives the instructions encrypts the data held by the image holding portion 886, by a predetermined encryption key (step S108). Then, a protected electronic document which contains the encrypted data as the document body, and further the document information and policy information held by the document information/policy information holding portion 888 is produced (step S110). Therefore, a protected electronic document corresponding to the protected electronic document which is read by the scanner is produced. The produced protected electronic document is stored in a storage device (not shown) disposed in an information processing apparatus (not shown) which can be used by the user who instructs the scanning operation.

If the kind of the operation is copying, the controlling portion 880 instructs the protected paper document producing portion 892 to produce a protected paper document. The protected paper document producing portion 892 which receives the instructions converts the document information and the policy information held by the document information/policy information holding portion 888, into machine readable codes (step S112). Then, the controlling portion instructs the printing portion 86 is instructed to print the data held by the image holding portion 886 together with the machine readable codes of the document information and the policy information, and, in accordance with the instructions, the printing portion 86 performs the printing process, thereby producing a protected paper document (step S114). As a result, a protected paper document which is a copy of the protected paper document read by the scanner is produced.

In the process example which has been described with reference to FIGS. 14 to 17, the slave security policy server 20 transmits the list of kinds of operations which are allowed to be performed by the user who wishes to use a protected document, to the client terminal 60 or the image forming apparatus 80, and the determination whether or not the operation can be executed is performed by the client terminal 60 or the image forming apparatus 80. In another example, the determination whether or not the operation can be executed is performed by the slave security policy server 20, and then a result of the determination is returned to the client terminal 60 or the image forming apparatus 80. In the case of the example, the client terminal 60 or the image forming apparatus 80 transmits a policy search request which further contains the kind of the operation that is instructed by the user, to the slave security policy server 20, and the slave security policy server 20 determines whether or not the operation can be executed, on the basis of the received kind of the operation and the policy search result (obtained in steps S64 and S65 of FIG. 15).

In the example of the embodiment which has been described above, a protected document itself contains the contents of a security policy which is set in the document. In the slave network 2, without accessing the security policy DB 100 of the master security policy server 10 which is referenced in production of the protected document, the use of the protected document is restricted by using the security policy contained in the protected document. In the slave security policy server 20, the security policy extracted from the protected document is registered into the security policy DB 200. After the security policy extracted from the protected document is registered into the security policy DS 200 of the slave security policy server 20, the use restriction of a protected document associated with the security policy is performed while referring to the security policy registered in the security policy DB 200. In the security policy DB 200, when the security policy of a certain policy ID is invalidated (the invalidation flag is set to "TRUE"), for example, the use of a protected document associated with the security policy is not allowed (see steps S56 and S68 of FIG. 15). Alternatively, in the security policy DB 200, when the security policy of a certain policy ID is updated, the use of a protected document which is associated with the security policy, and which contains the contents of the security policy before the updation is restricted in accordance with the updated security policy which is registered in the security policy DB 200 (see step S52 of FIG. 14, and steps S54, S56, S58, and S60 of FIG. 15).

By contrast, in the system of the example of the above-described embodiment, a situation may possibly occur where the contents of a security policy which has been registered in the security policy DB 200 of the slave security policy server 20 are updated in the master security policy server 10, and a protected document containing a security policy of the updated contents is produced. In this case, when a protected document containing the updated security policy is to be used in the slave network 2, the update time of the record in the security policy DB 200 of the policy ID associated with the protected document is compared with that of the security policy contained in the protected document, and, because the update time contained in the protected document is later, it is determined that the corresponding record of the security policy DB 200 is to be updated (YES in step S58 of FIG. 15). Then, the record of the policy ID of the security policy DB 200 is updated to the contents of the security policy contained in the protected document (step S70 of FIG. 15), and the updated security policy contained in the protected document is used in the use restriction of the protected document (steps S74 and S62 to S66 of FIG. 15).

In an example of the above-described embodiment, a protected document contains policy information indicating only the security policy which is set in the document. In another example, a protected document may contain not only the security policy which is set in the document, but also information indicating updation of the security policy in the security policy DB 100 of the master security policy server 10. When a list of security policies which can be set in a protected document is to be transmitted to the client terminal 50 or the image forming apparatus 70, for example, the master security policy server 10 transmits also the contents of security policies which are updated in the security policy DB 100 between the time of the previous transmission of the security policy list and the current time. In the client terminal 50 or the image forming apparatus 70, then, a protected document which contains policy updation information indicating the contents of the updated security policy in addition to policy information containing the security policy that is to be set in the document is produced. In the case where such a protected document is used in the client terminal 60 or the image forming apparatus 80 of the slave network 2, the client terminal 60 or the image forming apparatus 80 transmits the policy updation information in the protected document together with the above-described policy research request, to the slave security policy server 20. The slave security policy server 20 which receives the policy updation information updates the security policy DB 200 in accordance with the policy updation information.

In an example of the above-described embodiment, a security policy in which the kinds of operations which are allowed to the operation subject indicated by the usable range are set as the allowed function list is used. In another example of the setting of the security policy, allowance or inhibition may be expressly set for each of all kinds of operations which are executed on a protected document in the system. Alternatively, for example, a list of kinds of operations which are inhibited for the operation subject may be set in a security policy, and execution of an operation the kind of which is not included in the list may be allowed.

In an example of the above-described embodiment, as information indicating the validity of a security policy, the invalidation flag the value of which is either one of "TRUE" and "FALSE" is used. In another example, a variable indicating three kids of state, i.e., "Valid", "Invalid", and "Suspend (returnable invalidation)" may be used. In the example, a security policy which is once set to "Invalid" is never again changed to "Valid", but a security policy which is set to "Suspend" can be again set to "Valid".

In the above description, the apparatuses included in the master network 1 in which a protected document is produced do not have a function related to the use of a protected document, and those included in the slave network 2 in which a protected document is used do not have a function related to the production of a protected document. Alternatively, in each of two separated networks, an apparatus having both a function related to the use of a protected document, and that related to the production of a protected document may be disposed. In each network, for example, a security policy server having the functions of the portions of the master security policy server 10, and those of the portions of the slave security policy server 20, a client terminal including the document protection application 56 and the protected document use application 66, and an image forming apparatus having the document protecting function 78 and the protected document use function 88 may be disposed. In the case of the example, in each of the two networks, a security policy is newly produced and registered, and a protected document in which the security policy is set is produced. A protected document which is produced in one of the networks can be used in the other network, and vice versa.

Figure 18:
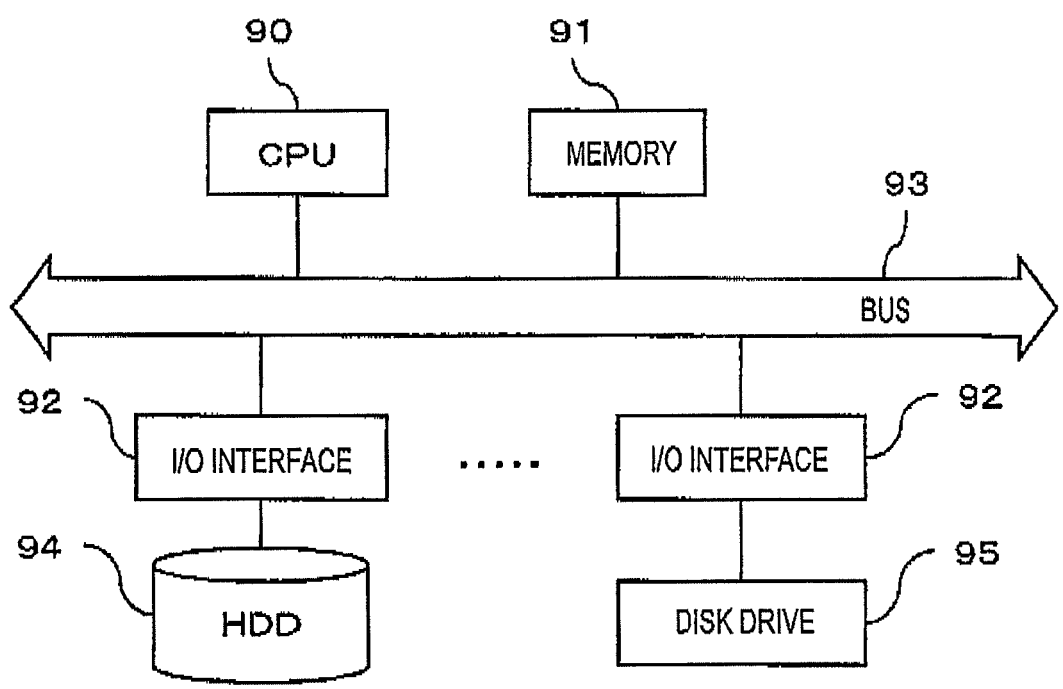
FIG. 18 is a diagram showing an example of the hardware configuration of a computer.

The various servers (the master security policy server 10, the slave security policy server 20, and the user authentication servers 30, 40) and client terminals 50, 60 which have been described above are typically realized by executing programs in which the functions of the apparatuses or the contents of the processes are described, in a general-purpose computer. As shown in FIG. 18, for example, the computer has, as hardware, a circuit configuration where a CPU (Central Processing Unit) 90, a memory (primary storage) 91, various I/O (input/output) interfaces 92, and the like are interconnected via a bus 93. An HDD (Hard Disk Drive) 94, and a disk drive 95 for reading various portable nonvolatile recording media such as a CD, a DVD, and a flash memory are connected to the bus 93 via, for example, the I/O interfaces 92. The drive 94 or 95 functions as an external storage device with respect to the memory. Programs in which the contents of the processes in the embodiment are described are stored into the fixed storage device such as the HDD 94 through a recording medium such as a CD or a DVD, or a network, and installed on the computer. The programs stored in the fixed storage device are read to the memory and executed by the CPU, whereby the processes in the embodiment are realized.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A document management system comprising:
    a document producing apparatus including:
        a protected document producing unit that, in accordance with protected document production instructions including: a document which is an object of use restriction; and use restriction information containing a set of an operation subject and operations which the operation subject is allowed or inhibited to perform, produces a protected document which contains: the document specified by the protected document production instructions; and the use restriction information specified by the protected document production instructions; and
    a document use managing apparatus including:
        a document information storage that stores document information of the document to be associated with the use restriction information;
        a document information registering unit that, in response to a use request specifying the protected document which is an object of the request, refers the document information storage, and that, in a case where document information of a document contained in the protected document specified by the use request is not stored in the document information storage, registers the document information contained in the specified protected document, and the use restriction information contained in the specified protected document, while the document information and the use restriction information are associated with each other;
        a use restriction information storage that store the use restriction information contained in the specified protected document; and
        a use restriction information registering unit that, in a case where the use restriction information contained in the specified protected document is not stored in use restriction information storage, registers the use restriction information contained in the specified protected document into the use restriction information storage,
    wherein
    determination whether the protected document which is the object of the request can be used or not is performed on the basis of the use restriction information associated with the document information contained in the protected document that is specified by the use request and stored in the use restriction information storage, and a requester who issues the use request,
    the document producing apparatus does not register the document information into the document information storage of the document use managing apparatus and the use restriction information into the use restriction information storage of the document use managing apparatus, and
    the document producing apparatus and the document use managing apparatus do not exchange the document information and the use restriction information via a communication.

2. The document management system as claimed in claim 1,
wherein
the document use managing apparatus comprises an updating unit that updates the use restriction information stored in the use restriction information storage.

3. The document management system as claimed in claim 2,
wherein
the updating unit, in accordance with invalidation instructions for specifying at least one of sets of use restriction information stored in the use restriction information storage, causes information indicating that the use restriction information specified by the invalidation instructions is invalid, to be stored into the use restriction information storage, and
in a case where information indicating that the use restriction information associated with the document contained in the protected document specified by the use request is invalid is stored in the use restriction information storage, a use of the protected document which is an object of the request is not allowed.

4. The document management system as claimed in claim 2,
wherein
the protected document production instructions include an update time of the use restriction information specified by the protected document production instructions,
the protected document produced by the protected document producing unit contains the update time included in the protected document production instructions,
the updating unit, in a case where the use restriction information stored in the use restriction information storage is updated, causes the update time of the use restriction information to be stored into the use restriction information storage, and
the updating unit, in a case where the update time contained in the protected document specified in the use request is later than the update time of the use restriction information associated with the document contained in the protected document that is specified by the use request in the use restriction information stored in the use restriction information storage, updates the use restriction information associated with the document contained in the specified protected document to the use restriction information contained in the specified protected document.

* * * * *